(12) United States Patent
Yata et al.

(10) Patent No.: US 10,636,370 B2
(45) Date of Patent: Apr. 28, 2020

(54) DISPLAY DEVICE

(71) Applicant: Japan Display Inc., Tokyo (JP)

(72) Inventors: Tatsuya Yata, Tokyo (JP); Kazunari Tomizawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/215,001

(22) Filed: Dec. 10, 2018

(65) Prior Publication Data

US 2019/0180703 A1 Jun. 13, 2019

(30) Foreign Application Priority Data

Dec. 12, 2017 (JP) .................. 2017-237473

(51) Int. Cl.
*G09G 3/36* (2006.01)
*G02F 1/1335* (2006.01)
*G02F 1/1343* (2006.01)

(52) U.S. Cl.
CPC ....... *G09G 3/3607* (2013.01); *G02F 1/13439* (2013.01); *G02F 1/133512* (2013.01); *G02F 1/133514* (2013.01); *G02F 1/133553* (2013.01); *G02F 2201/52* (2013.01); *G09G 2320/0242* (2013.01); *G09G 2320/0271* (2013.01); *G09G 2320/0686* (2013.01); *G09G 2360/144* (2013.01)

(58) Field of Classification Search
CPC ......... G02F 1/133512; G02F 1/133514; G02F 1/133553; G02F 1/13439; G02F 2201/52; G09G 2320/0242; G09G 2320/0271; G09G 2320/0686; G09G 2360/144; G09G 3/3607

USPC .......................................... 345/88, 590, 690
See application file for complete search history.

(56) References Cited

U.S. PATENT DOCUMENTS

| | | | | |
|---|---|---|---|---|
| 9,418,619 B2* | 8/2016 | Nakagawa | ........... | G09G 3/2003 |
| 9,734,772 B2* | 8/2017 | Mitsui | .................. | G09G 3/3607 |
| 9,972,255 B2* | 5/2018 | Kabe | .................... | G09G 3/3607 |
| 2005/0195280 A1* | 9/2005 | Murakami | ............. | G09G 3/007 348/173 |
| 2006/0187232 A1* | 8/2006 | Kempf | ..................... | G09G 5/04 345/591 |
| 2006/0267892 A1* | 11/2006 | Pei | ........................ | G09G 3/3685 345/88 |
| 2007/0030284 A1* | 2/2007 | Ogasawara | .......... | G09G 3/2003 345/589 |
| 2007/0081103 A1* | 4/2007 | Ahn | ........................ | H04N 9/73 348/655 |

(Continued)

FOREIGN PATENT DOCUMENTS

JP 2014-139647 A 7/2014
WO 2012/077565 A1 6/2012

*Primary Examiner* — Tony O Davis
(74) *Attorney, Agent, or Firm* — K&L Gates LLP

(57) ABSTRACT

According to an aspect, a display device includes: a display unit including a plurality of pixels; and an image processor configured to generate an image signal for displaying an image on the display unit. When the image processor causes the display unit to display the image such that a first pixel region that displays a first color is adjacent to a second pixel region that displays a second color and that has luminance higher than luminance of the first color, the image processor applies gain to an image signal corresponding to a pixel in the second pixel region to make brightness of the second pixel region lower than brightness of the first pixel region.

11 Claims, 18 Drawing Sheets

(56) References Cited

U.S. PATENT DOCUMENTS

| | | | |
|---|---|---|---|
| 2007/0188661 A1* | 8/2007 | Chen | H04N 1/62 348/649 |
| 2008/0309787 A1* | 12/2008 | Notsu | H04N 5/335 348/222.1 |
| 2009/0002298 A1* | 1/2009 | Furukawa | G09G 5/02 345/88 |
| 2009/0322798 A1* | 12/2009 | Lin | G09G 3/2074 345/690 |
| 2010/0091032 A1* | 4/2010 | Ueki | G09G 3/2003 345/590 |
| 2012/0002133 A1* | 1/2012 | Yamazaki | G09G 3/342 349/61 |
| 2012/0236016 A1* | 9/2012 | Fujino | G09G 3/3241 345/589 |
| 2013/0258258 A1 | 10/2013 | Nakamura et al. | |
| 2014/0168284 A1* | 6/2014 | Kabe | G09G 3/3648 345/690 |
| 2014/0321740 A1* | 10/2014 | Huang | G06T 5/003 382/165 |
| 2015/0242701 A1* | 8/2015 | Tokui | H04N 5/243 382/190 |
| 2015/0254505 A1* | 9/2015 | Sohgawa | G06T 5/00 382/112 |
| 2017/0087869 A1* | 3/2017 | Suzuki | B41J 2/2103 |
| 2017/0205652 A1* | 7/2017 | Zhou | G09G 3/3426 |
| 2018/0330677 A1* | 11/2018 | Guo | G09G 3/2003 |
| 2019/0180703 A1* | 6/2019 | Yata | G09G 3/3607 |

\* cited by examiner

FIG.4

| REPRODUCED COLOR | WHITE | RED | GREEN | BLUE | YELLOW | CYAN | MAGENTA |
|---|---|---|---|---|---|---|---|
| INPUT (R, G, B) | (n, n, n) | (n, 0, 0) | (0, n, 0) | (0, 0, n) | (m, m, 0) | (0, m, m) | (m, 0, m) |
| OUTPUT (R1, RG1, BG1, B1) | (n1, n2, n3, n4) | (n, 0, 0, 0) | (0, n5, n6, 0) | (0, 0, 0, n) | (m1, m2, m3, 0) | (0, m4, m5, m6) | (m7, 0, 0, m8) |

FIG.17

| W | Y1 (R1+RG1) | DINGINESS |
|---|---|---|
| 1 | 1 | PRESENT |
| 0.99 | 1 | PRESENT |
| 0.98 | 1 | PRESENT |
| 0.97 | 1 | PRESENT |
| 0.96 | 1 | PRESENT |
| 0.95 | 1 | PRESENT |
| 0.94 | 1 | PRESENT |
| 0.93 | 1 | PRESENT |
| 0.92 | 1 | PRESENT |
| 0.91 | 1 | PRESENT |
| 0.9 | 1 | PRESENT |
| 0.89 | 1 | PRESENT |
| 0.88 | 1 | PRESENT |
| 0.87 | 1 | PRESENT |
| 0.86 | 1 | PRESENT |
| 0.85 | 1 | NOT PRESENT |
| 0.84 | 1 | NOT PRESENT |
| ⋮ | ⋮ | ⋮ |

FIG.18

| W | Y2<br>(R1+RG1+BG1) | DINGINESS |
|---|---|---|
| 1 | 1 | PRESENT |
| 0.99 | 1 | PRESENT |
| 0.98 | 1 | PRESENT |
| 0.97 | 1 | PRESENT |
| 0.96 | 1 | PRESENT |
| 0.95 | 1 | PRESENT |
| 0.94 | 1 | PRESENT |
| 0.93 | 1 | PRESENT |
| 0.92 | 1 | PRESENT |
| 0.91 | 1 | PRESENT |
| 0.9 | 1 | NOT PRESENT |
| 0.89 | 1 | NOT PRESENT |
| 0.88 | 1 | NOT PRESENT |
| 0.87 | 1 | NOT PRESENT |
| 0.86 | 1 | NOT PRESENT |
| 0.85 | 1 | NOT PRESENT |
| 0.84 | 1 | NOT PRESENT |
| ⋮ | ⋮ | ⋮ |

DISPLAY DEVICE

CROSS-REFERENCE TO RELATED APPLICATIONS

This application claims priority from Japanese Application No. 2017-237473, filed on Dec. 12, 2017, the contents of which are incorporated by reference herein in its entirety.

BACKGROUND

1. Technical Field

The present disclosure relates to a display device.

2. Description of the Related Art

Japanese Patent Application Laid-open Publication No. 2014-139647 discloses a known display device that outputs an image by applying gain to gradation values of a pixel in order to enhance luminance of the pixel and improve visual quality of the image.

Optical illusion has been known to occur in perceived colors. The term "optical illusion", as used herein, refers to a phenomenon in which a color of a certain region looks like a different color, which is caused by a color of a region adjacent to the certain region. Thus, when color regions having different levels of brightness are adjacent to each other, simply applying gain may cause a relatively bright color region to look dingy. When, for example, a region of a pure color, such as yellow, is surrounded by a white region, in particular, the pure color region may look dingy as if its saturation were lower than actual saturation.

For the foregoing reasons, there is a need for a display device that can prevent optical illusion as if saturation were lowered.

SUMMARY

According to an aspect, a display device includes: a display unit including a plurality of pixels; and an image processor configured to generate an image signal for displaying an image on the display unit. When the image processor causes the display unit to display the image such that a first pixel region that displays a first color is adjacent to a second pixel region that displays a second color and that has luminance higher than luminance of the first color, the image processor applies gain to an image signal corresponding to a pixel in the second pixel region to make brightness of the second pixel region lower than brightness of the first pixel region.

BRIEF DESCRIPTION OF THE DRAWINGS

FIG. 4 is a table indicating exemplary relations among reproduced colors by a single pixel, input gradation values applied as image signals constituting an input image, and the sub-pixels used for the output;

FIG. 17 is a table for reference data that schematically indicates an exemplary relation between a ratio of brightness of white and brightness of yellow adjacent to white and occurrence of dinginess;

FIG. 18 is a table for reference data that schematically indicates an exemplary relation between a ratio of brightness of white and brightness of yellow adjacent to white and occurrence of dinginess;

DETAILED DESCRIPTION

Figure 1:
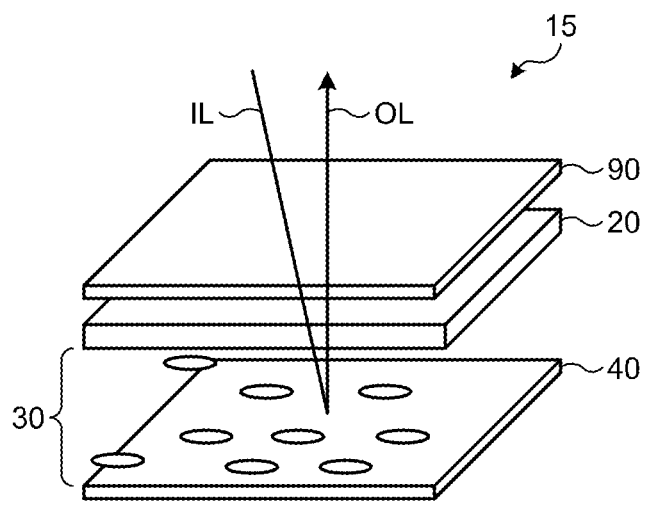
FIG. 1 is a perspective view schematically illustrating a main configuration of a single sub-pixel.

Modes (embodiments) for carrying out the present disclosure will be described below in detail with reference to the drawings. The disclosure is given by way of example only, and various changes made without departing from the spirit of the disclosure and easily conceivable by those skilled in the art naturally fall within the scope of the present disclosure. The drawings may possibly illustrate the width, the thickness, the shape, and other elements of each unit more schematically than the actual aspect to simplify the explanation. These elements, however, are given by way of example only and are not intended to limit interpretation of the present disclosure. In the specification and the drawings, components similar to those previously described with reference to a preceding drawing are denoted by like reference numerals, and overlapping explanation thereof will be appropriately omitted. In this disclosure, when an element A is described as being "on" another element B, the element A can be directly on the other element B, or there can be one or more elements between the element A and the other element B.

Figure 2:
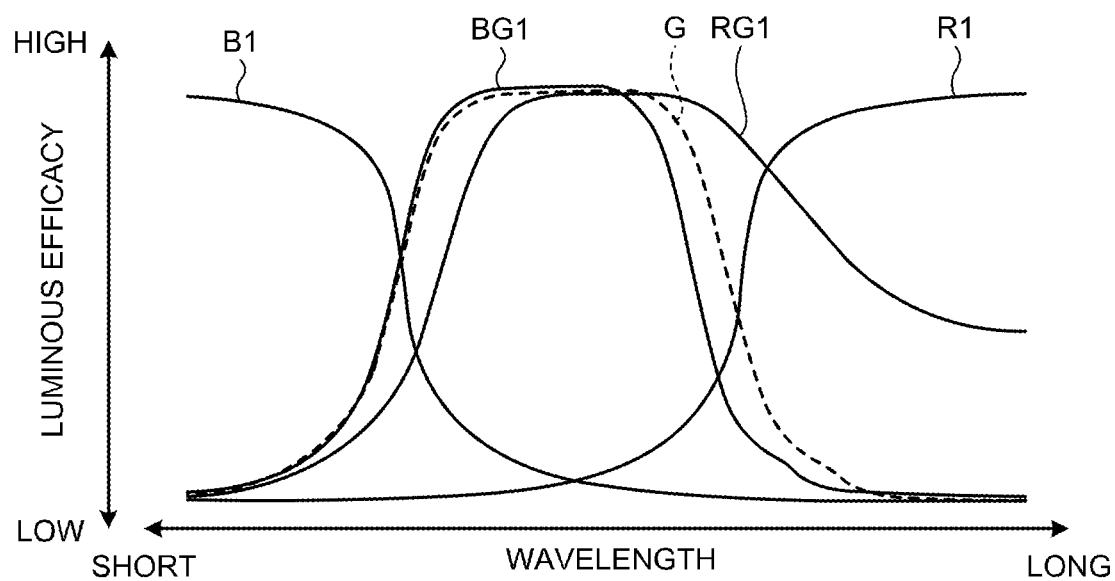
FIG. 2 is a graph indicating exemplary spectra of red, reddish green, green, bluish green, and blue.

FIG. 1 is a perspective view schematically illustrating a main configuration of a single sub-pixel 15. FIG. 2 is a graph indicating exemplary spectra of red, reddish green, green, bluish green, and blue. The sub-pixel 15 includes a color filter 20 and a reflective electrode 40. The color filter 20 has light transmissivity. The color filter 20 has a predetermined peak of a spectrum of light OL to be transmitted. Specifically, the peak of the spectrum of the light OL to be transmitted through the color filter 20 falls on any one of spectra of four colors, i.e., the spectrum of reddish green (e.g., red green RG1), the spectrum of bluish green (e.g., blue green BG1), the spectrum of red (e.g., red R1), and the spectrum of blue (e.g., blue B1). As exemplified in FIG. 2, the peak of the spectrum of the red green RG1 has a portion overlapping with the peak of the spectrum of light viewed as green G. The peak of the spectrum of the blue green BG1 has a portion overlapping with the peak of the spectrum of light viewed as the green G. The spectrum of the red green RG1 is closer to the spectrum of the red R1 (on the long wavelength side) than the spectrum of the blue green BG1 and the spectrum of the green G are. The spectrum of the blue green BG1 is closer to the spectrum of the blue B1 (on the short wavelength side) than the spectrum of the red green RG1 and the spectrum of the green G are.

The reflective electrode 40 reflects the light OL that is transmitted through the color filter 20. A liquid crystal layer 30 is disposed between the color filter 20 and the reflective electrode 40. The liquid crystal layer 30 includes a multitude of liquid crystal molecules having an orientation determined according to a voltage applied thereto by the reflective electrode 40, for example. The liquid crystal molecule varies a degree of transmission of the light OL that passes between the color filter 20 and the reflective electrode 40 according to the orientation. A light modulation layer 90 may be disposed on the opposite side of the liquid crystal layer 30 with the color filter 20 interposed therebetween. The light modulation layer 90 modulates, for example, a scattering direction of the light OL from the reflective electrode side.

Figure 3:
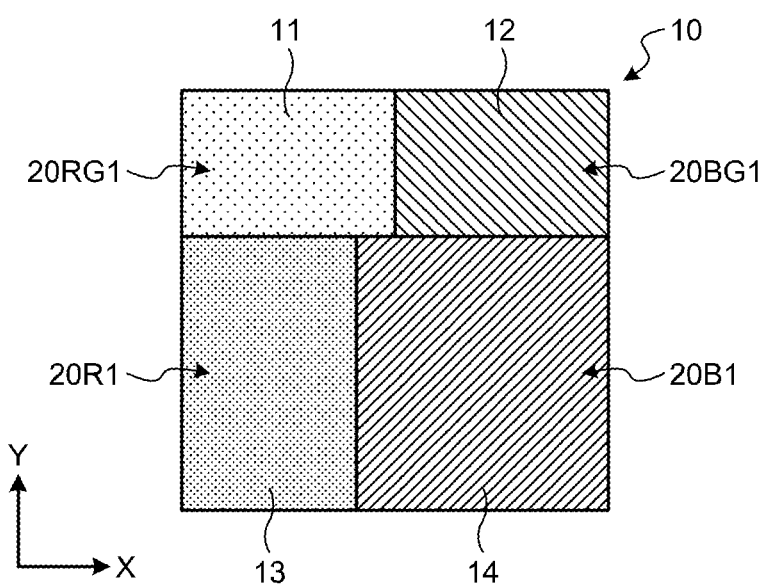
FIG. 3 is a diagram illustrating exemplary shapes and sizes of sub-pixels included in a single pixel, an exemplary positional relation among the sub-pixels, and exemplary color filters of the respective sub-pixels.

FIG. 3 is a diagram illustrating exemplary shapes and sizes of the sub-pixels 15 included in a single pixel 10, an exemplary positional relation among the sub-pixels 15, and exemplary color filters 20 of the respective sub-pixels 15.

The pixel 10 includes a first sub-pixel 11, a second sub-pixel 12, a third sub-pixel 13, and a fourth sub-pixel 14. The first sub-pixel 11 includes a first color filter 20RG1. The second sub-pixel 12 includes a second color filter 20BG1. The third sub-pixel 13 includes a third color filter 20R1. The fourth sub-pixel 14 includes a fourth color filter 20B1. The peak of the spectrum of the light transmitted through the first color filter 20RG1 falls on the spectrum of the reddish green (red green RG1). The peak of the spectrum of the light transmitted through the second color filter 20BG1 falls on the spectrum of the bluish green (blue green BG1). The peak of the spectrum of the light transmitted through the third color filter 20R1 falls on the spectrum of the red (red R1). The peak of the spectrum of the light transmitted through the fourth color filter 20B1 falls on the spectrum of the blue (blue B1). The pixel has a square shape in a plan view, and includes the sub-pixels in the respective four colors in respective regions obtained by sectioning the square pixel region. The sub-pixels each have a square or rectangular shape in a plan view (hereinafter collectively referred to as a rectangle). The four rectangles are combined to form the square pixel. A light shielding layer such as a black matrix may be disposed in regions between the sub-pixels and an outer edge of the pixel, but this light shielding layer occupies only a small area of the pixel. Thus, when describing the shapes or combination of the sub-pixels or the shape of the pixel, such a light shielding layer may be substantially disregarded as a linear object constituting an outer edge (side) of the pixel or the sub-pixel.

In the following description of the embodiment, the term "color filter 20" will be used to describe the color filter 20 when the peak of the spectrum of the light OL to be transmitted is not differentiated. When the peak of the spectrum of the light OL to be transmitted is differentiated, the color filter 20 will be described as, for example, the first color filter 20RG1, where appropriate. The term "sub-pixel 15" will be used when the sub-pixel 15 is not differentiated by the colors of the color filters 20 included in the respective sub-pixels 15.

The third sub-pixel 13 and the fourth sub-pixel 14 are each greater in size than the first sub-pixel 11 and the second sub-pixel 12. The first sub-pixel 11 added to the second sub-pixel 12 has a size equal to or greater than a size of the third sub-pixel 13. The fourth sub-pixel 14 is greater in size than the third sub-pixel 13. The first sub-pixel 11 is identical in size to the second sub-pixel 12. When an area ratio of the first sub-pixel 11, the second sub-pixel 12, the third sub-pixel 13, and the fourth sub-pixel 14 is expressed as A to B to C to D, the following expressions hold: $0.65 \leq A = B < 1.0$, $1.0 \leq C < D$, $D = 4 - (A + B + C)$, and $D \leq 1.7$. FIG. 3 exemplifies a case in which the expression of A to B to C to D=0.744 to 0.744 to 1.130 to 1.382 holds. In this case, the first sub-pixel 11 added to the second sub-pixel 12 has a size equal to or greater than a size of the third sub-pixel 13 and has a size equal to or greater than a size of the fourth sub-pixel 14. In the embodiment, the first sub-pixel shares part of a side with the fourth sub-pixel. In contrast, the second sub-pixel and the third sub-pixel share no side. More specifically, a side shared between the first sub-pixel and the second sub-pixel coincides with an intermediate line dividing the pixel laterally into half. In contrast, a side shared between the third sub-pixel and the fourth sub-pixel is shifted toward the first sub-pixel with respect to the intermediate line. As a result, the first sub-pixel and the fourth sub-pixel share part of the side.

FIG. 4 is a table listing reproduced colors by a single pixel 10, gradation values of R, G, and B input as image signals to the pixel 10, and output states of the sub-pixels 15 corresponding to the respective input signals. When the input gradation values of R, G, and B (hereinafter referred to as the input gradation values) as image signals constituting an input image are expressed as (R, G, B)=(n, n, n), the reproduced color is white and the first sub-pixel 11, the second sub-pixel 12, the third sub-pixel 13, and the fourth sub-pixel 14 are used for the output. When the input gradation values are expressed as (R, G, B)=(n, 0, 0), the reproduced color is red and the third sub-pixel 13 is used for the output. When the input gradation values are expressed as (R, G, B)=(0, n, 0), the reproduced color is green and the first sub-pixel 11 and the second sub-pixel 12 are used for the output. Thus, in the embodiment, green is reproduced through a combination of the first sub-pixel 11 and the second sub-pixel 12. When the input gradation values are expressed as (R, G, B)=(0, 0, n), the reproduced color is blue and the fourth sub-pixel 14 is used for the output. When the input gradation values are expressed as (R, G, B)=(m, m, 0), the reproduced color is yellow and the first sub-pixel 11, the second sub-pixel 12, and the third sub-pixel 13, for example, are used for the output. When the input gradation values are expressed as (R, G, B)=(0, m, m), the reproduced color is cyan and the first sub-pixel 11, the second sub-pixel 12, and the fourth sub-pixel 14 are used for the output. When the input gradation values are expressed as (R, G, B)=(m, 0, m), the reproduced color is magenta and the third sub-pixel 13 and the fourth sub-pixel 14 are used for the output.

The reproduction of yellow described with reference to FIG. 4 is illustrative only and does not limit the present disclosure. For example, the first sub-pixel 11 may be combined with the third sub-pixel 13 to reproduce yellow. Alternatively, the second sub-pixel 12 may be combined with the third sub-pixel 13 to reproduce yellow.

Figure 5:
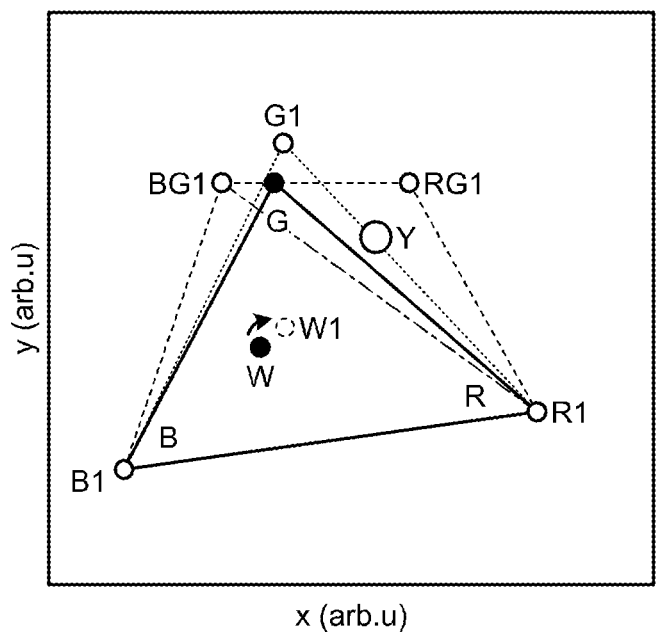
FIG. 5 is a chart indicating a schematic chromaticity diagram (xy chromaticity diagram) that represents a correspondence relation between yellow reproduced by a display device in an embodiment and the peaks of spectra of light transmitted through the color filter, the chromaticity diagram being plotted within chromaticity coordinates (xy chromaticity coordinates)

FIG. 5 is a chart indicating a schematic chromaticity diagram (xy chromaticity diagram) that represents a correspondence relation between yellow reproduced by a display device in the embodiment and the peaks of spectra of the light OL transmitted through the color filter 20, the chromaticity diagram being plotted within chromaticity coordinates (xy chromaticity coordinates). Assume that the solid-line triangle having three vertexes of R, G, and B in FIG. 5 represents a color space indicating colors that can be reproduced by sub-pixels of respective three colors of conventional red (R), conventional green (G), and conventional blue (B) included in the conventional display device with respect to yellow Y required for the display device. Such a conventional display device cannot reproduce the yellow Y. Specifically, the conventional display device cannot place the coordinates of the yellow Y within the triangle and thus cannot reproduce the required yellow.

Trying to reproduce the yellow Y using the sub-pixels of three colors by the conventional technology requires the coordinates of the conventional red (R) and those of the conventional green (G) to be shifted to the coordinates of red (e.g., R1) and those of green (e.g., G1), respectively, which can reproduce the yellow Y. However, simply shifting the coordinates as described above causes the white point (W) to be shifted toward the yellow Y. Specifically, setting the red (e.g., R1) and the green (e.g., G1) by targeting the reproduction of the yellow Y in the conventional display device causes a color reproduced by lighting all the sub-pixels to be tinged with yellow as a whole, resulting in changing color reproducibility. FIG. 5 schematically indicates the white point (W) before being shifted toward the yellow Y using a black dot. FIG. 5 further indicates the white point after having been shifted toward the yellow Y using a blank dot outlined by the broken line and denoted as W1. Setting the red (e.g., R1) and the green (e.g., G1) by targeting the reproduction of the required yellow Y means to further darken these colors, and reduce light transmission efficiency of the color filter 20 and luminance, resulting in dark yellow.

An approach is conceivable in which the yellow sub-pixel is added to the conventional display device. This approach still causes the color reproduced by lighting all the sub-pixels to be tinged with yellow as a whole, resulting in changing color reproducibility.

The display device according to the embodiment, on the other hand, reproduces yellow through the combination of the first sub-pixel 11, the second sub-pixel 12, and the third sub-pixel 13. Specifically, the peaks of the spectra of light transmitted through the first color filter 20RG1, the second color filter 20BG1, and the third color filter 20R1, respectively, are set such that a combined color of the red green RG1, the blue green BG1, and the red R1 is the yellow Y. This configuration allows the yellow Y to be reproduced using the three sub-pixels 15 out of the four sub-pixels 15 of the single pixel 10. Thus, the embodiment allows a wider area encompassing the first sub-pixel 11, the second sub-pixel 12, and the third sub-pixel 13 out of a display region of the single pixel 10 to be easily allocated to the reproduction of the yellow Y, thereby reliably achieving luminance and saturation of the yellow Y. Furthermore, the embodiment also enhances the luminance and the saturation of cyan. Additionally, as compared with a configuration including a sub-pixel corresponding to white (W), the embodiment allows the third sub-pixel 13 including the third color filter 20R1 corresponding to the red (R1) to be easily enlarged, thereby further enhancing the reproducibility of primary colors. The peak of the spectrum of the light transmitted through the second color filter 20BG1 falls on the spectrum of the bluish green (first blue green BG1) (coordinate BG1 in FIG. 5). Thus, the embodiment obtains a blue component using the second sub-pixel 12 out of the sub-pixels 15 used for the reproduction of the yellow Y, thereby preventing the white point (W) from being shifted toward the yellow Y.

The light transmissivity of the first color filter 20RG1 having the peak of the spectrum of the light transmitted therethrough falling on the spectrum of the reddish green (e.g., red green RG1) is extremely high. Thus, the embodiment uses the first sub-pixel 11 including the first color filter 20RG1 for the reproduction of the yellow Y, thereby achieving the luminance and the saturation of the yellow Y more reliably.

In the reflective display device, a reflection factor and contrast of the light OL by the reflective electrode 40 remain constant. Meanwhile, the visual quality of colors of an image output by the display device depends on the light source color and luminous intensity of external light IL. In other words, the reflective display device has an extreme difficulty in adjusting colors and luminance by adjusting the light source. Thus, when the external light IL is obtained under a bright environment, for example, the visual quality of colors of the image tends to be good. In contrast, when the external light IL is obtained under a dark environment, reliable visibility is relatively difficult to achieve. The color filter 20 does not completely transmit the external light IL regardless of the peak of the spectrum of the light OL to be transmitted, and absorbs part of the external light IL. Trying to darken the reproduced color using the color filter increases a ratio of the absorbed part of the external light IL. Thus, the reflective display device is required to balance the saturation and the luminance by adjusting an area ratio of the color filters 20 without depending on the adjustment of the light source. Application of the present embodiment to even such a reflective display device having the conditions described above can still reliably obtain the luminance and saturation of the yellow Y.

In the embodiment, the area ratio of the first color filter 20RG1, the second color filter 20BG1, the third color filter 20R1, and the fourth color filter 20B1, and the spectra of the red green RG1, the blue green BG1, the red R1, and the blue B1 are determined depending on the required white point W and the required luminance and saturation of the yellow Y. The coordinates of the blue B1 in the embodiment and the conventional blue (B), which are identical to each other in FIG. 5, may be different from each other. The coordinates of the red R1 in the embodiment and the conventional red (R), which are identical to each other in FIG. 5, may be different from each other. Although the combination of the red green RG1 and the blue green BG1 reproduces the conventional green (G) (or the color indicated by the coordinates G in FIG. 5), the combination of the red green RG1 and the blue green BG1 may reproduce green that is different from the conventional green (G).

Figure 6:
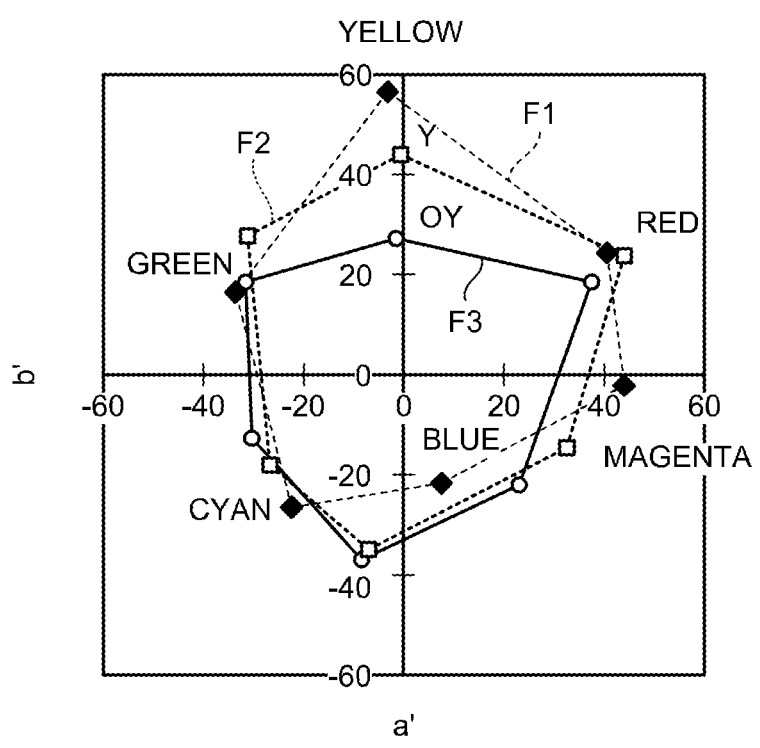
FIG. 6 is a chart indicating exemplary color reproducibility of the embodiment and that of a comparative example in an L*a*b* color space.

FIG. 6 is a chart indicating exemplary color reproducibility of the embodiment and that of a comparative example in an L*a*b* color space. In FIG. 6, F1 indicates yellow, green, cyan, blue, magenta, and red specified by the Specifications for Newsprint Advertising Production (SNAP). A display device in the comparative example indicated by F3 in FIG. 6 is what is called an RGBW reflective display device that includes sub-pixels of four colors, i.e., white (W) in addition to the conventional red (R), the conventional green (G), and the conventional blue (B). In FIG. 6, F2 indicates coordinates of the respective colors in the embodiment described with reference to FIGS. 1 to 5. As illustrated in FIG. 6, the embodiment can reproduce the yellow Y that is brighter and more vivid than yellow OY to be reproduced by the display device in the comparative example. The display device in the embodiment can satisfy demand from the advertising or the like for display using bright and vivid yellow by reproducing the yellow Y.

Figure 7:
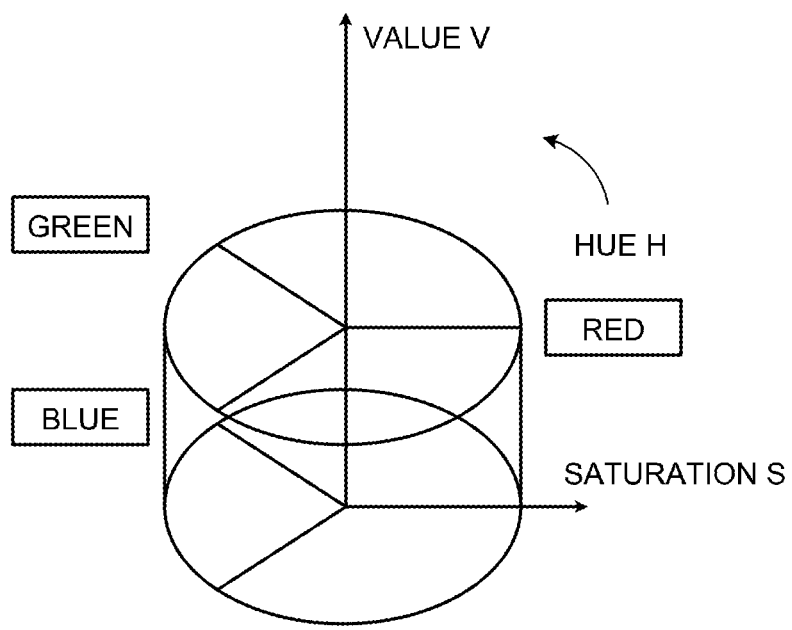
FIG. 7 is a conceptual diagram illustrating a typical HSV (hue-saturation-value, value is also called brightness) color space.
Figure 8:
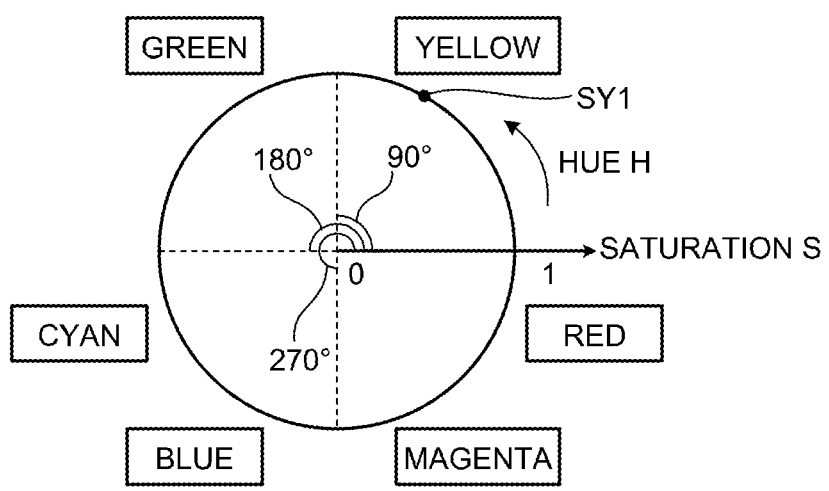
FIG. 8 is a conceptual diagram illustrating a relation between hue and saturation in the typical HSV color space.

FIG. 7 is a conceptual diagram illustrating a typical HSV (hue-saturation-value, value is also called brightness) color space. FIG. 8 is a conceptual diagram illustrating a relation between hue and saturation in the typical HSV color space. As illustrated in FIG. 7, a dynamic range of brightness in the HSV color space remains constant regardless of hue and saturation in the embodiment. Specifically, as illustrated in FIGS. 7 and 8, the HSV color space can be represented by a circular cylindrical shape having a height variable according to the dynamic range of brightness and a circular cross-sectional shape that indicates a relation between hue and saturation to be reproduced by a combination of colors of the sub-pixels 15.

The saturation in the HSV color space is determined by a ratio of R to G to B of the input gradation values. For example, when the input gradation values of R, G, and B are expressed as (R, G, B)=(n, n, 0), the color indicated by the input gradation values is yellow having the highest saturation within the reproducible range. The color having the highest saturation is positioned in the outermost circumference in the circular columnar HSV color space in FIG. 7. When the input gradation values of R, G, and B are expressed as (R, G, B)=(n, n, n), the color indicated by the input gradation values is white having the lowest saturation within the reproducible range. The color having the lowest saturation is positioned at the center in the circular cylindrical HSV color space in FIG. 7.

Figure 9:
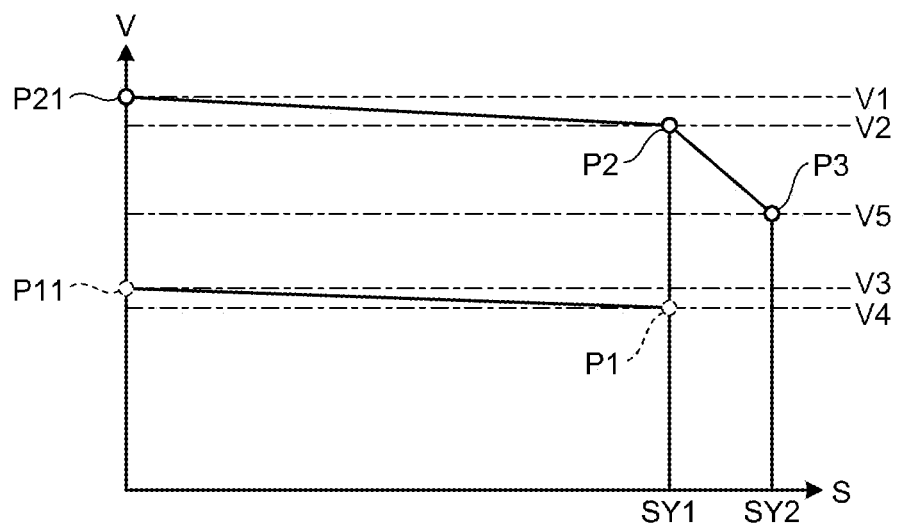
FIG. 9 is a diagram illustrating an exemplary relation between saturation and value of yellow in an HSV color space in the embodiment.

FIG. 9 is a diagram illustrating an exemplary relation between saturation and brightness of yellow in the HSV color space in the embodiment. The following describes an example in which the color is yellow. The brightness in the HSV color space is determined by a maximum value among the values of R, G, and B constituting the input gradation values. Assume that the values of R, G, and B are each represented by an 8-bit value that falls within a range (0 to 255). When the input gradation values are expressed as (R, G, B)=(128, 128, 0), yellow indicated by the input gradation values is yellow at a position P1 in FIG. 9. Yellow at a position P2 at which the yellow has maximum reproducible brightness V2 may be expressed, for example, as (R, G, B)=(255, 255, 0). When the input gradation values are expressed as (R, G, B)=(128, 128, 128), white indicated by the input gradation values is white at a position P11 in FIG. 9. White at a position P21 at which the white has maximum reproducible brightness V1 may be expressed, for example, as (R, G, B)=(255, 255, 255).

In the embodiment, the maximum brightness V1 of white exceeds the maximum brightness V2 of yellow. This is because, whereas all the sub-pixels 15 are used to reproduce white, the fourth sub-pixel 14 is not used to reproduce yellow. Specifically, the brightness of white is higher than that of yellow by an amount corresponding to the fourth sub-pixel 14. This relation applies not only to the maximum brightness V1 and V2, but also to the brightness of white and that of yellow when the maximum values of the gradation values of R, G, and B are identical. For example, brightness V3 of the white at the position P11 having the gradation values expressed as (R, G, B)=(128, 128, 128) exceeds brightness V4 of yellow at the position P1 having the gradation values expressed as (R, G, B)=(128, 128, 0). For the same reason, the brightness of white exceeds the brightness of another color when the maximum values of the gradation values of R, G, and B are identical.

The following describes an example of an input image using a pixel having the input gradation values expressed as (R, G, B)=(255, 255, 0) and a pixel having the input gradation values expressed as (R, G, B)=(255, 255, 255). When such an input image is displayed faithfully, yellow of the pixel having the input gradation values expressed as (R, G, B)=(255, 255, 0) may look dingy.

Figure 10:
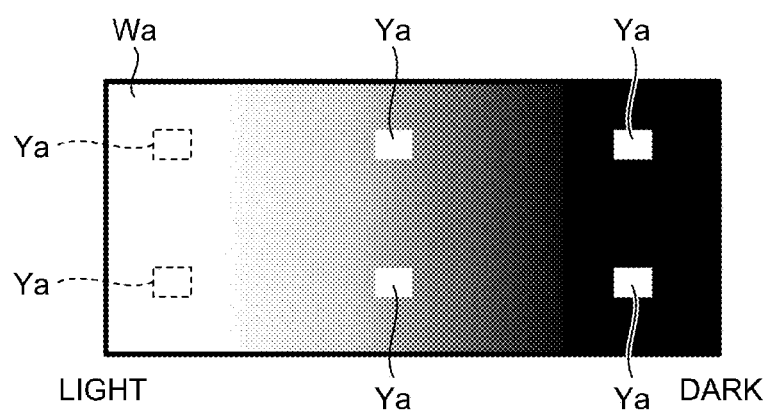
FIG. 10 is a schematic diagram illustrating an example in which a yellow region adjacent to a white region looks dingy.

FIG. 10 is a schematic diagram illustrating an example in which a white region Wa has a background color of yellow regions Ya. The white region Wa gradually decreases its brightness from left to right and becomes black at the rightmost end. As illustrated in FIG. 10, when the brightness of the white region Wa is high, the yellow region Ya adjacent to the white region Wa looks dingy, resulting in an image in which vividness of yellow is hardly recognized. While the yellow regions Ya are surrounded by the broken lines in FIG. 10 to denote the regions, the yellow regions Ya look like being merged into the white region Wa without the broken lines, because of dinginess of the yellow regions Ya. As a result, a boundary of the colors is difficult to discern.

Figure 11:
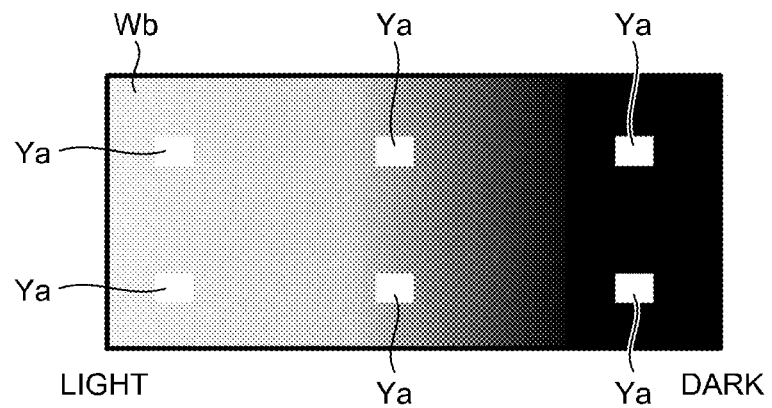
FIG. 11 is a schematic diagram illustrating an example in which a white region having lower brightness than that of the white region illustrated in FIG. 10 prevents dinginess of the yellow region.

In contrast, FIG. 11 is a schematic diagram illustrating an example in which a white region Wb having brightness that is made lower than brightness of the white region Wa of FIG. has a background color of the yellow regions Ya. Similarly to the example illustrated in FIG. 10, the white region Wb illustrated in FIG. 11 has saturation gradually decreased from the left end toward the right end and becomes black on the right end. Meanwhile, the brightness on the left end is higher in FIG. 10 than in FIG. 11. The input value (brightness) of the yellow region Ya remains the same throughout FIGS. 10 and 11. As illustrated in the example of FIG. 11, in comparison with the example of FIG. 10, decreasing the brightness of white adjacent to the yellow regions Ya allows the yellow regions Ya to be more easily viewed. This prevents a situation in which the yellow regions Ya look dingy. Specifically, the image can be perceived as an image maintaining vividness of yellow.

Specifically, when a first pixel region that displays a first color is adjacent to a second pixel region that displays a second color having gradation values providing luminance higher than luminance of the first color, an image processor 110 (see FIG. 28) in the embodiment applies gain to the second color so that the brightness in the second color has an upper limit lower than the maximum brightness of the first color. When, for example, the maximum value among the gradation values indicating the first color is equal to the maximum value among the gradation values indicating the second color, the second color is viewed as a color having luminance higher than the luminance of the first color. The first color is yellow, for example. The second color is white, for example. The first pixel region is, for example, the yellow region Ya in FIG. 11. The second pixel region is, for example, the white region Wb in FIG. 11.

Figure 12:
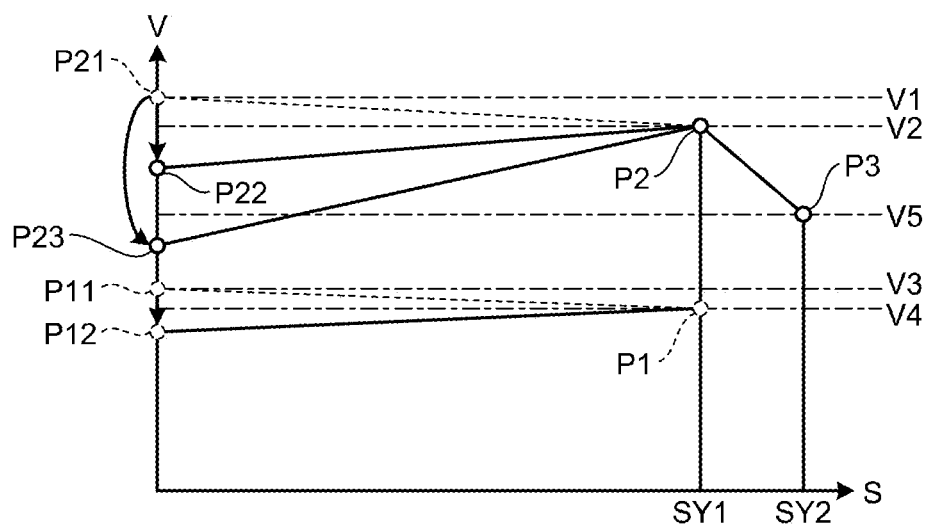
FIG. 12 is a diagram illustrating an example in which brightness of white is made lower than brightness of yellow.

FIG. 12 is a diagram illustrating an example in which brightness of white is made lower than brightness of yellow. The image processor 110 applies gain to the second color so that the upper limit of the brightness of the second color is lower than the maximum reproducible brightness of the first color. Specifically, the image processor 110 applies gain to the gradation values, for example, such that the white at the position P21 is replaced by white at a position P22. The brightness of the white at the position P22 is lower than the brightness of the yellow at the position P2. With this mechanism, yellow, which may look dingy when the yellow at the position P2 is adjacent to the white at the position P21 (see FIG. 10), is prevented from looking dingy by applying gain to white to replace the white at the position P21 with the white at the position P22 (see FIG. 11).

More specifically, the image processor 110 multiplies the gradation values of the second color by a reverse gain factor ($\beta<1$). The white at the position P21 and the white at the position P22 have a relation expressed as P22=P21×$\beta$. The value of $\beta$ is determined such that the brightness of the white at the position P22 is lower than the brightness of the yellow at the position P2 (maximum brightness V2). The multiplication by the brightness reduction factor $\beta$ is performed for not only white with the maximum brightness V1, but also all kinds of white included in a single input image. Accordingly, when the white at the position P21 is replaced with the white at the position P22, the white at the position P11 is replaced with white at a position P12. A relation between the white at the position P11 and the white at the position P12 is expressed as P12=P11×$\beta$. Thus, the brightness of the white at the position P12 is lower than the brightness V3 of the yellow at the position P1.

The embodiment can reproduce yellow through the combination of the first sub-pixel 11 and the third sub-pixel 13 as described above. Yellow with the maximum gradation values reproduced through the combination of the first sub-pixel 11 and the third sub-pixel 13 is, for example, yellow at a position P3 illustrated in FIGS. 9 and 12. The brightness V5 of the yellow at the position P3 is lower than the brightness (maximum brightness V2) of the yellow at the position P1 by an amount corresponding to the second sub-pixel 12 that is not used for reproduction of yellow. Meanwhile, saturation SY2 of the yellow at the position P3 is higher than saturation SY1 (see FIG. 8) of the yellow at the position P1.

When the first color (yellow) adjacent to the second color (e.g., white) is reproduced through the combination of the first sub-pixel 11 and the third sub-pixel 13, the image processor 110 multiplies the gradation values by the reverse gain factor ($\beta<1$) so that, for example, the white at the position P21 is replaced with white at a position P23. Specifically, the value of $\beta$ is determined so that the brightness of the white at the position P23 is lower than the brightness (brightness V5) of the yellow at the position P3.

The multiplication is not limited to the use of the reverse gain factor ($\beta$). The image processor 110 may further apply gain to uniformly increase the gradation values of the pixels constituting the input image. Assume a case in which the gradation values of white in the input image are expressed as (R, G, B)=(128, 128, 128) and the gradation values of yellow in the input image are expressed as (R, G, B)=(128, 128, 0). In this case, the image processor 110 may multiply the gradation values of each pixel by an expansion factor ($\alpha$) to increase the gradation values so that the maximum value of the gradation values exceeds 128. Assume a case in which an expansion factor ($\alpha$) to increase the gradation values from 128 to 255. In this case, multiplying the gradation values of each pixel by the expansion factor ($\alpha$) turns the yellow at the position P1 to the yellow at the position P2, and turns the white at the position P11 to the white at the position P21. The foregoing operation, however, causes the brightness of white to exceed the brightness of yellow. For this reason, the image processor 110 multiplies the gradation values of white by the reverse gain factor ($\beta$) to make the brightness of white lower than the brightness of yellow.

The image processor 110 may determine whether to make the brightness of the second color lower than the brightness of the first color based on the brightness of external light. For example, when the brightness of the external light is equal to or higher than a predetermined level, the image processor 110 may multiply the gradation values of the second color by the reverse gain factor ($\beta<1$). The foregoing approach may be taken because saturation and contrast of a color affect the impression of an image more significantly as light illuminating the image becomes brighter. Specifically, under the condition where the image is illuminated by light having brightness equal to or higher than a predetermined level, the need for preventing dinginess to make saturation of the color be correctly viewed increases. On the other hand, when the light illuminating the image has brightness lower than the predetermined level, the entire image before the application of gain looks dark. In such cases, gain may be applied so as to increase the brightness regardless of the color involved, which allows the image to be easily viewed. A threshold of the brightness of the external light for the foregoing various types of gain processing is determined in advance on the basis of, for example, results of measurement taken in advance. Gain may even be applied to the gradation values of the second color so as to make the brightness of the second color lower than the brightness of the first color regardless of the brightness of the external light.

Criteria may be added in applying gain to make the brightness of the second color lower than the brightness of the first color. The image processor 110 may, for example, use a positional relation between the first pixel region and the second pixel region as a criterion. As a specific example, a criterion may be employed in which a predetermined ratio or more of the periphery of the first pixel region is surrounded by the second pixel region. This criterion is employed because the dinginess of the first pixel region described above tends to be more recognizable as the second pixel region is perceived more clearly as the background color of the first pixel region. In this respect, a criterion may be employed in which the second pixel region adjacent to the first pixel region has a size (area) equal to or greater than a predetermined value, e.g., the second pixel region has a size equal to or greater than a size of the first pixel region. This criterion is employed because the above-described dinginess is more likely to occur as the size of the second pixel region adjacent to the first pixel region becomes larger. The threshold of the ratio of the periphery of the first pixel region surrounded by the second pixel region, the threshold of the size of the second pixel region, and various other parameters that function as the criteria are determined in advance on the basis of, for example, results of measurement taken in advance.

The first color is not limited to yellow. The first color may be, for example, a primary color such as red, blue, and green, a complementary color such as cyan and magenta, or any color other than white. The second color is not limited to white. The second color may be, for example, any color other than the first color, which tends to act as a color making the adjacent first color look dingy.

Figure 13:
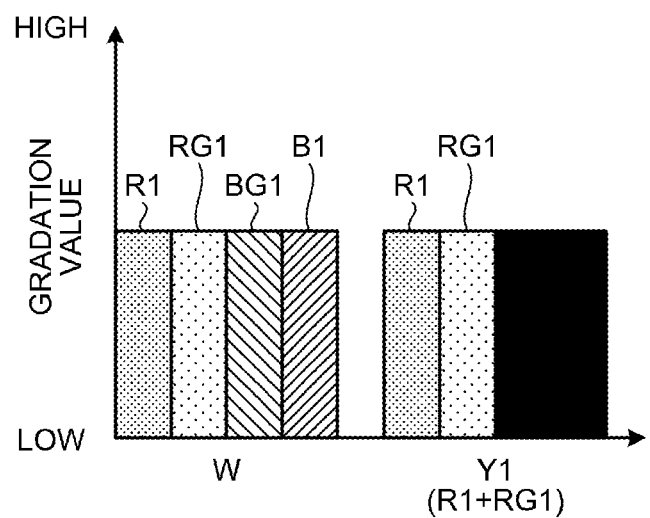
FIG. 13 is a diagram illustrating an exemplary combination of white reproduced using all colors allocated to the sub-pixels and yellow reproduced through a combination of red and red green.
Figure 14:
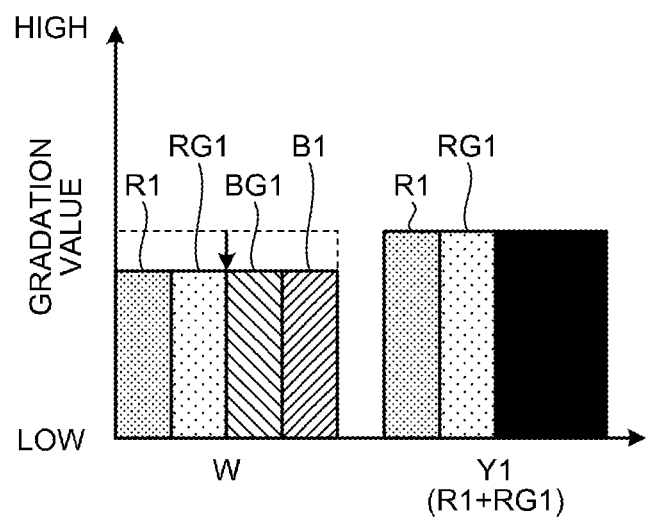
FIG. 14 is a diagram illustrating an example in which, in the combination of FIG. 13, gain applied to gradation values of white is reduced relative to gain applied to gradation values of yellow.

FIG. 13 is a diagram illustrating an exemplary combination of white W reproduced using all colors allocated to the sub-pixels 15 and yellow Y1 reproduced through a combination of the red R1 and the red green RG1. FIG. 14 is a diagram illustrating an example in which, in the combination of FIG. 13, gain applied to the gradation values of the white W is reduced relative to gain applied to the gradation values of the yellow Y1. Assume that a relation between the gradation values of the yellow Y1 and the gradation values of the white W is such that the brightness is equal to each other as illustrated in FIG. 13. In this case, the gradation values of the white W are multiplied by the reverse gain factor ($\beta$). The multiplication allows the brightness of the yellow Y1 to be higher than the brightness of the white W as illustrated in FIG. 14. This operation can prevent, the dinginess of the yellow Y1 even when a pixel region of the yellow Y1 is adjacent to a pixel region of the white W.

Figure 15:
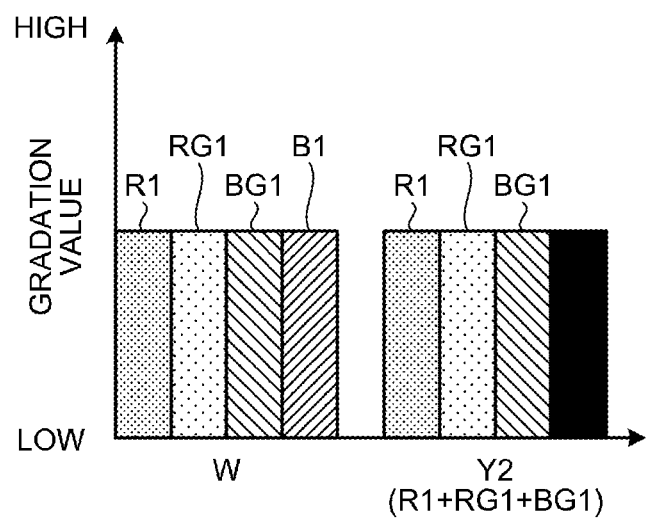
FIG. 15 is a diagram illustrating an exemplary combination of white reproduced using all colors allocated to the sub-pixels and yellow reproduced through a combination of red, red green, and blue green.
Figure 16:
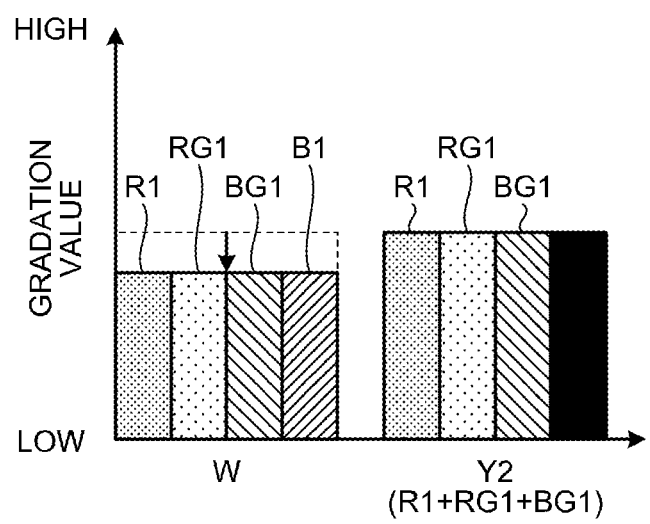
FIG. 16 is a diagram illustrating an example in which, in the combination of FIG. 15, gain applied to gradation values of the white W is reduced relative to gain applied to gradation values of the yellow.

FIG. 15 is a diagram illustrating an exemplary combination of the white W reproduced using all colors allocated to the sub-pixels 15 and yellow Y2 reproduced through a combination of the red R1, the red green RG1, and the blue green BG1. FIG. 16 is a diagram illustrating an example in which, in the combination of FIG. 15, gain applied to the gradation values of the white W is reduced relative to gain applied to the gradation values of the yellow Y2. Assume that a relation between the gradation values of the yellow Y2 and the gradation values of the white W is such that the brightness is equal to each other as illustrated in FIG. 15. In this case, the gradation values of the white W are multiplied by the reverse gain factor ($\beta$). The multiplication allows the brightness of the yellow Y2 to be higher than the brightness of the white W as illustrated in FIG. 16. This operation can prevent the dinginess of the yellow Y2 even when a pixel region of the yellow Y2 is adjacent to the pixel region of the white W. The yellow Y1 and the yellow Y2 each represent an example of a color adopted as the yellow Y in the embodiment.

FIG. 17 is a table for reference data that schematically indicates an exemplary relation between a ratio of brightness of the white W and brightness of the yellow Y1 adjacent to the white W and occurrence of dinginess. FIG. 18 is a table for reference data that schematically indicates an exemplary relation between a ratio of brightness of the white W and brightness of the yellow Y2 adjacent to the white W and occurrence of dinginess. In a display device 1 (see FIG. 26), for example, it has been confirmed that in a case where the pixel region of the white W is adjacent to the pixel region of the yellow Y1, the dinginess occurs when the brightness of the white W is 0.86 or higher with the brightness of the yellow Y1 being defined as 1, as illustrated in FIG. 17, for example. For this reason, in the display device 1, the reverse gain factor ($\beta$) is set so that the brightness of the white W is equal to or lower than 0.85 when the brightness of the yellow Y1 is defined as 1.

Furthermore, in the display device 1, it has been confirmed that in a case where the pixel region of the white W is adjacent to the pixel region of the yellow Y2, the dinginess occurs when the brightness of the white W is 0.91 or higher with the brightness of the yellow Y2 being defined as 1, as illustrated in FIG. 18, for example. For this reason, in the display device 1, the reverse gain factor ($\beta$) is set so that the brightness of the white W is equal to or lower than 0.9 when the brightness of the yellow Y2 is defined as 1.

To reproduce the yellow Y2, the second sub-pixel 12 is used in addition to the first sub-pixel 11 and the third sub-pixel 13 used for reproduction of the yellow Y1. This approach can increase an area of the reflective electrodes 40 of the sub-pixels 15 to be used for reproduction of the color. Accordingly, the pixel 10 that reproduces the yellow Y2 has luminance higher than luminance of the pixel 10 that reproduces the yellow Y1. Employing the yellow Y2 as described above allows the reverse gain factor ($\beta$) to be a value closer to 1. Specifically, this approach can further reduce a difference between a contrast ratio between the white W and the yellow Y2 before the application of gain and a contrast ratio between the white W and the yellow Y2 after the application of gain.

In consideration of the above-described difference between the yellow Y1 and the yellow Y2, the yellow Y1 to be reproduced by the pixel 10 in the first pixel region may be replaced with the yellow Y2 depending on the ratio of brightness of the yellow Y1 in the first pixel region to brightness of the white W in the second pixel region adjacent to the first pixel region. As a specific example on the basis of FIGS. 17 and 18, when a single image displayed according to an input image includes the yellow Y1 in the first pixel region and the white W in the second pixel region adjacent to the first pixel region; and the brightness of the white W ranges between 0.86 and 0.9 inclusive with the brightness of the yellow Y1 being defined as 1, the yellow Y1 to be reproduced by the pixel 10 in the first pixel region may be replaced with the yellow Y2. Specifically, when the first color (e.g., yellow) is the yellow Y1 to be reproduced through the combination of the first sub-pixel 11 and the third sub-pixel 13, the image processor 110 may add the second sub-pixel 12 for the reproduction of the first color in the first pixel region. The combination of the sub-pixels 15 to be used for the reproduction of the first color such as the yellow Y1 or the yellow Y2 and the ratio of brightness to be employed as the conditions for replacement described above are illustrative only. The combination and the conditions do not limit the present disclosure and may be changed as appropriate.

The application of gain on the basis of the combination of the red R1, the red green RG1, the blue green BG1, and the blue B1 has been described. The process for reducing gain to be applied to the gradation values of the second color can be employed for a display device including sub-pixels of other colors. The process may be employed, e.g., for what is called a transmissive liquid crystal display device, an electrophoresis display device (e-paper), and a display device incorporating an organic light emitting diode (OLED).

Figure 19:
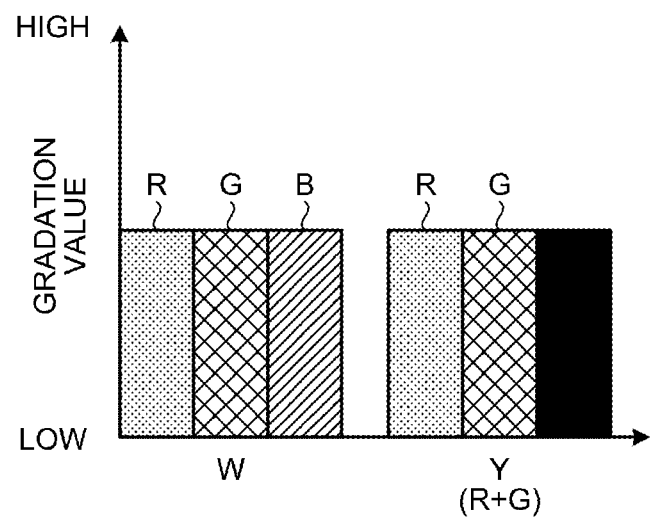
FIG. 19 is a diagram illustrating an exemplary combination of white reproduced using the sub-pixels of three colors of R, G, and B and yellow reproduced using the sub-pixels of two colors out of the three colors of R, G, and B.
Figure 20:
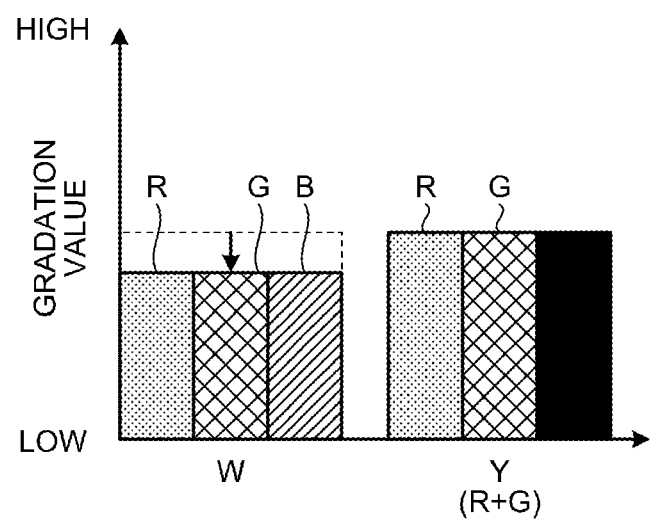
FIG. 20 is a diagram illustrating an example in which, in the combination of FIG. 19, gain applied to the gradation values of white is reduced relative to gain applied to the gradation values of yellow.

FIG. 19 is a diagram illustrating an exemplary combination of the white W reproduced using the sub-pixels of three colors of R, G, and B and the yellow Y reproduced using the sub-pixels of two colors out of the three colors of R, G, and B. FIG. 20 is a diagram illustrating an example in which, in the combination of FIG. 19, gain applied to the gradation values of the white W is reduced relative to gain applied to the gradation values of the yellow Y. Assume that a relation between the gradation values of the yellow Y and the gradation values of the white W is such that the brightness is equal to each other as illustrated in FIG. 19. In this case, the image processor 110 multiplies the gradation values of the white W by the reverse gain factor ($\beta$). The multiplication allows the brightness of the yellow Y to be higher than the brightness of the white W as illustrated in FIG. 20. This approach can prevent the dinginess of the yellow Y even when a pixel region of the yellow Y is adjacent to a pixel region of the white W.

Figure 21:
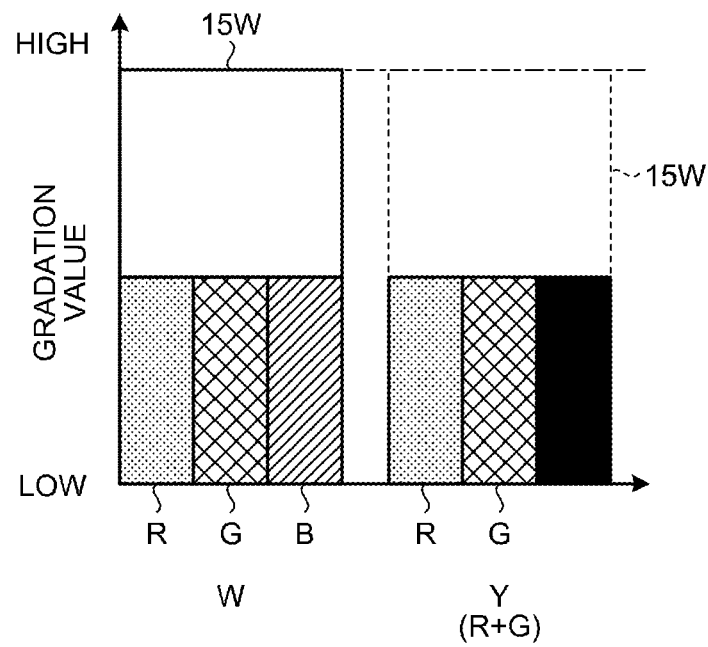
FIG. 21 is a diagram illustrating an exemplary combination of white and yellow reproduced using the sub-pixels of four colors of R, G, B, and W.
Figure 22:
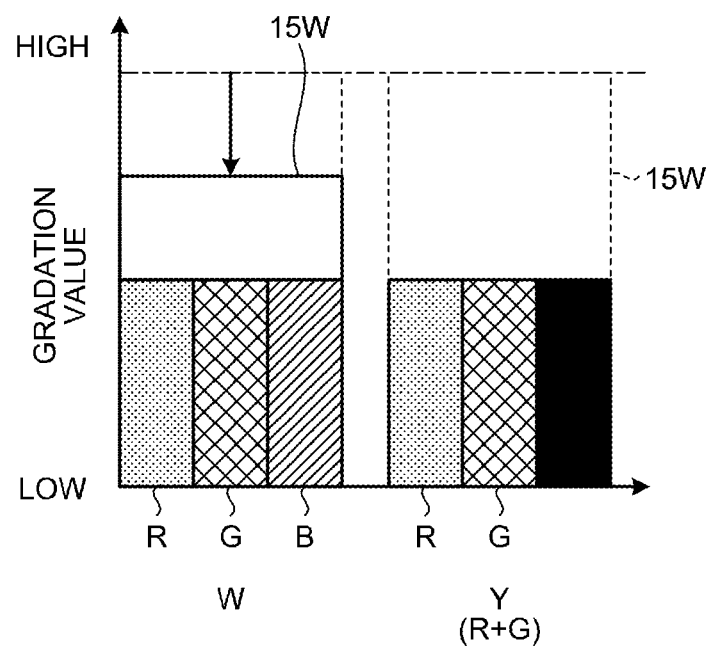
FIG. 22 is a diagram illustrating an example in which, in the combination of FIG. 21, brightness of white is reduced.

FIG. 21 is a diagram illustrating an exemplary combination of the white W and the yellow Y reproduced using the sub-pixels 15 of four colors of R, G, B, and W. FIG. 22 is a diagram illustrating an example in which, in the combination of FIG. 21, brightness of the white W is reduced. Assume that the brightness of the white W is higher than the brightness of the yellow Y as illustrated in FIG. 21. In this case, the image processor 110 reduces the gradation value of the white W by performing, for example, processing of multiplying the gradation value of the white W by the reverse gain factor ($\beta$). Specifically, the image processor 110 reduces the gradation value of a white sub-pixel 15 (15W) out of the sub-pixels 15 of the four colors of R, G, B, and W. This processing can reduce the brightness of the white W as illustrated in FIG. 22, thereby reducing the dinginess of the yellow Y.

Figure 23:
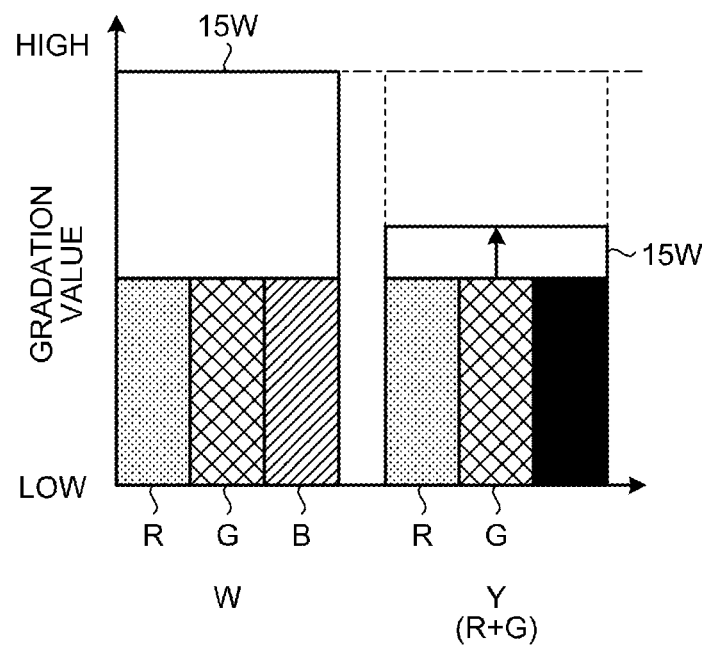
FIG. 23 is a diagram illustrating an example in which, in the combination of FIG. 21, the brightness of yellow is increased.

FIG. 23 is a diagram illustrating an example in which, in the combination of FIG. 21, the brightness of the yellow Y is increased. The present disclosure is not limited to the processing of reducing the brightness of the white W as described with reference to FIG. 22, and the image processor 110 may increase the brightness of the yellow Y using the white sub-pixel 15 (15W) as illustrated in FIG. 23. This processing can prevent dinginess of the yellow Y caused by the surrounding white W.

Figure 24:
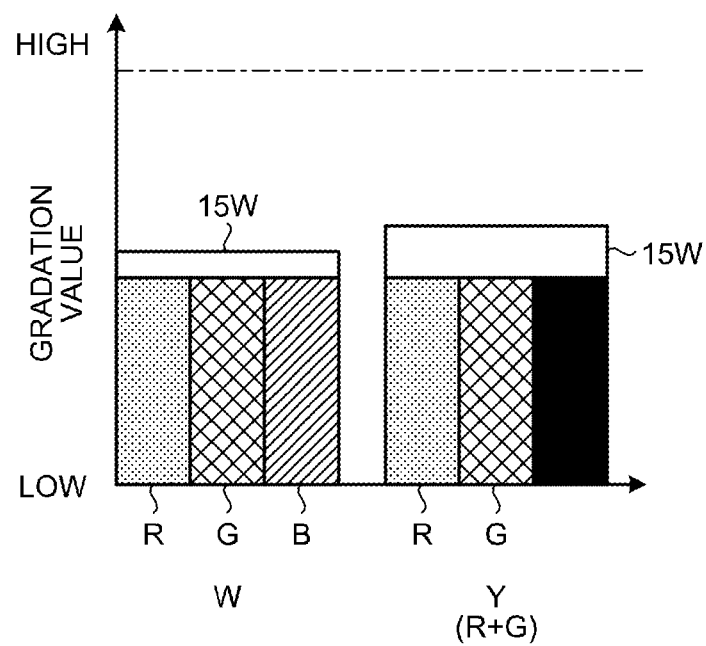
FIG. 24 is a diagram illustrating an example in which brightness of white is made lower than brightness of yellow.

FIG. 24 is a diagram illustrating an example in which the brightness of the white W is made lower than the brightness of yellow. The image processor 110 may perform both the processing of reducing the brightness of the white W as described with reference to FIG. 22 and the processing of increasing the brightness of the yellow Y as described with reference to FIG. 23. Consequently, the brightness of the white W is made lower than the brightness of the yellow Y as illustrated in FIG. 24, whereby dinginess of the yellow Y caused by the surrounding white W can be prevented. Further, the smaller the gradation value of the white sub-pixel (W) in the pixel of the yellow Y is, the higher the saturation of the yellow Y can be.

Figure 25:
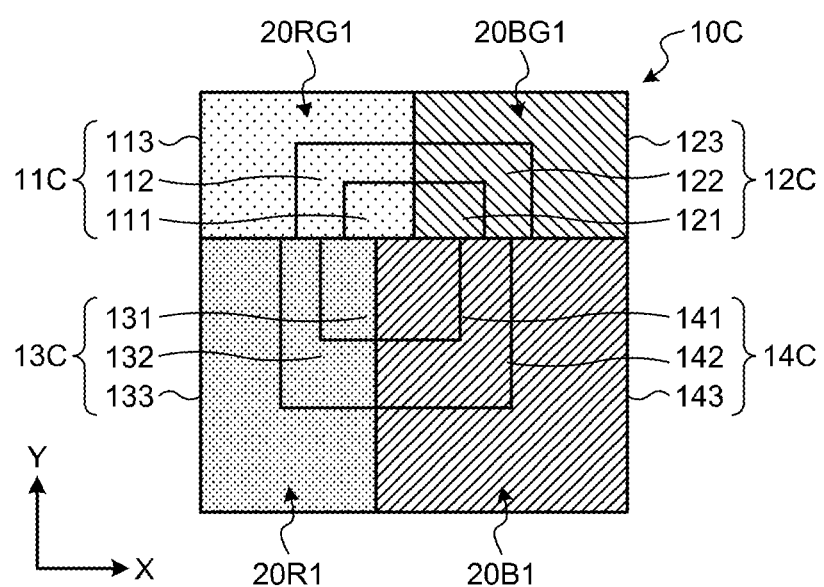
FIG. 25 is a diagram illustrating an example of dividing each sub-pixel into a plurality of regions having different areas for area coverage modulation.

FIG. 25 is a diagram illustrating an example of dividing each sub-pixel 15 into a plurality of regions having different areas for area coverage modulation. In the display device according to the embodiment, a pixel 10C includes a first sub-pixel 11C, a second sub-pixel 12C, a third sub-pixel 13C, and a fourth sub-pixel 14C, for example, as illustrated in FIG. 25. The first sub-pixel 11C including the first color filter 20RG1 includes three regions having different areas including a first sub-divided pixel 111, a second sub-divided pixel 112, and a third sub-divided pixel 113. The first sub-divided pixel 111, the second sub-divided pixel 112, and the third sub-divided pixel 113 have an area ratio of, for example, 1 to 2 to 4 ($=2^0$ to $2^1$ to $2^2$). The first sub-pixel 11C has gradation performance of three bits (eight gradations) through combinations of whether each of the first sub-divided pixel 111, the second sub-divided pixel 112, and the third sub-divided pixel 113 transmits light. More specifically, area coverage modulation performed through the combination patterns of whether each of the first sub-divided pixel 111, the second sub-divided pixel 112, and the third sub-divided pixel 113 transmits light is expressed as "0 to 0 to 0", "1 to 0 to 0", "0 to 1 to 0", "1 to 1 to 0", "0 to 0 to 1", "1 to 0 to 1", "0 to 1 to 1", and "1 to 1 to 1" in ascending order of an output gradation, where 1 denotes that the specific sub-divided pixel transmits light and 0 denotes that the specific sub-divided pixel does not transmit light. A black matrix 23 (see FIG. 27) is disposed between the sub-pixels 15. For example, the black matrix 23 is disposed among a plurality of color filters 20. For example, the black matrix 23 may be a black filter or may be configured such that the color filters of two adjacent sub-pixels are superimposed on top of one another to reduce transmissivity in the overlapping part. The black matrix 23 may be omitted. A ratio of area coverage modulation by the sub-divided pixels (e.g., 1 to 2 to 4) corresponds to an aperture ratio in a plan view. Thus, in a configuration including the black matrix 23, the ratio of area coverage modulation corresponds to a ratio of openings on which the black matrix 23 is not disposed. In a configuration without the black matrix 23, the ratio of area coverage modulation corresponds to an area ratio of the reflective electrodes 40 included in the respective sub-divided pixels. Specific shapes of the reflective electrodes 40 vary depending on how the sub-pixel is divided. For example, in FIG. 25, the reflective electrodes 40 having a rectangular shape, an L-shape, and an L-shape are provided from the central side of the pixel 10C with the respective sub-divided pixels.

The second sub-pixel 12C including the second color filter 20BG1 includes a plurality of sub-divided pixels that may be a first sub-divided pixel 121, a second sub-divided pixel 122, and a third sub-divided pixel 123. The third sub-pixel 13C including the third color filter 20R1 includes a plurality of sub-divided pixels that may be a first sub-divided pixel 131, a second sub-divided pixel 132, and a third sub-divided pixel 133. The fourth sub-pixel 14C including the fourth color filter 20B1 includes a plurality of sub-divided pixels that may be a first sub-divided pixel 141, a second sub-divided pixel 142, and a third sub-divided pixel 143. The second sub-pixel 12C, the third sub-pixel 13C, and the fourth sub-pixel 14C each achieve the area coverage modulation through the same mechanism as that of the first sub-pixel 11C.

The first sub-pixel 11C, the second sub-pixel 12C, the third sub-pixel 13C, and the fourth sub-pixel 14C are configured in the same manner as the first sub-pixel 11, the second sub-pixel 12, the third sub-pixel 13, and the fourth sub-pixel 14 described above, respectively, except that the first sub-pixel 11C, the second sub-pixel 12C, the third sub-pixel 13C, and the fourth sub-pixel 14C each include the sub-divided pixels.

As described above, the sub-pixels 15 illustrated in FIG. 25 are each divided into a plurality of sub-divided pixels having different areas. Gradation expression for each of the sub-pixels 15 is performed through a combination of whether each of the sub-divided pixels transmits light. The number of sub-divided pixels included in a single sub-pixel 15 may be two, or four or more. Gradation performance of a single sub-pixel 15 in the area coverage modulation is indicated by the number of bits (N bits) corresponding to the number (N) of the sub-divided pixels, where N is a natural number of 2 or greater. Assuming that the area of the smallest sub-divided pixel is 1, the q-th (q-th bit) sub-divided pixel from the smallest sub-divided pixel has an area of $2^{(q-1)}$.

To apply the brightness gain using the area coverage modulation, the image processor 110 performs dithering in a predetermined region (area). Specifically, the image processor 110 reduces the brightness of white in the entire first pixel region by mixing a predetermined ratio of pixels displaying white with low gradations and pixels displaying white with medium gradations into pixels included in the first pixel region.

The following describes a detailed configuration of the display device 1 in the embodiment of the present disclosure with reference to FIGS. 26 to 29.

Figure 26:
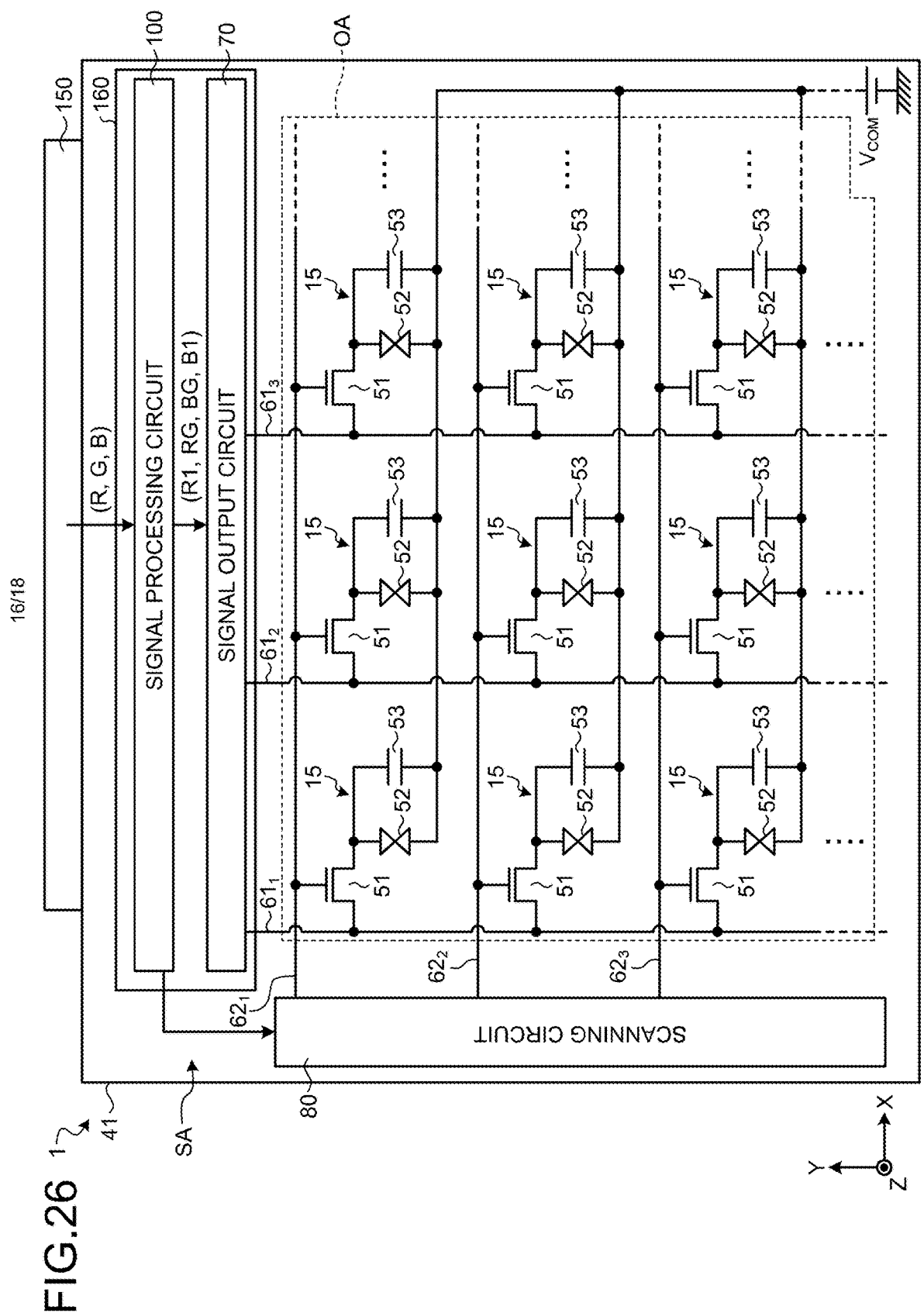
FIG. 26 is a diagram illustrating an exemplary circuit configuration of the display device.

FIG. 26 is a diagram illustrating an exemplary circuit configuration of the display device 1. The X-direction in FIG. 26 indicates a row direction of the display device 1, and the Y-direction in FIG. 26 indicates a column direction of the display device 1. As illustrated in FIG. 26, the sub-pixel 15 includes, for example, a pixel transistor 51 employing a thin-film transistor (TFT), a liquid crystal capacitor 52, and a holding capacitor 53. The pixel transistor 51 has a gate electrode coupled with a scanning line 62 ($62_1$, $62_2$, $62_3$, . . . ) and a source electrode coupled with a signal line 61 ($61_1$, $61_2$, $61_3$, . . . ).

The liquid crystal capacitor 52 denotes a capacitance component of a liquid crystal material generated between the reflective electrode 40 provided for each sub-pixel 15 and a counter electrode 22 (see FIG. 27) facing some of or all of the reflective electrodes 40. The reflective electrode 40 is coupled with a drain electrode of the pixel transistor 51. A common potential $V_{COM}$ is applied to the counter electrode 22. The common potential $V_{COM}$ is inverted at predetermined cycles in order to inversely drive the sub-pixel 15. The holding capacitor 53 has two electrodes. One of the electrodes has a potential identical to that of the reflective electrode 40 and the other of the electrodes has a potential identical to that of the counter electrode 22.

The pixel transistor 51 is coupled with the signal line 61 extending in the column direction and the scanning line 62 extending in the row direction. The sub-divided pixels are provided to intersections of the signal lines 61 and the scanning lines 62 in a display region OA. The signal lines 61 ($61_1$, $61_2$, $61_3$, . . . ) each have one end coupled with an output terminal corresponding to each column of a signal output circuit 70. The scanning lines 62 ($62_1$, $62_2$, $62_3$, . . . ) each have one end coupled with an output terminal corresponding to each row of a scanning circuit 80. The signal lines 61 ($61_1$, $61_2$, $61_3$, . . . ) each transmit a signal for driving the sub-pixel 15, i.e., a video signal output from the signal output circuit 70, to the sub-pixel 15, on a pixel column by pixel column basis. The scanning lines 62 ($62_1$, $62_2$, $62_3$, . . . ) each transmit a signal for selecting the sub-pixel 15 row by row, i.e., a scanning signal output from the scanning circuit 80, to each pixel row.

The signal output circuit 70 and the scanning circuit 80 are coupled with a signal processing circuit 100. The signal processing circuit 100 calculates gradation values (R1, RG, BG, and B1 to be described later) of each of the four sub-pixels 15 included in each pixel (e.g., pixel 10) according to the input gradation values. The signal processing circuit 100 outputs to the signal output circuit 70 a calculation result as area coverage modulation signals (Ro, RGo, BGo, and Bo) of each pixel. The signal output circuit 70 transmits to each sub-pixel 15 the video signal including the area coverage modulation signals (Ro, RGo, BGo, and Bo). The signal processing circuit 100 also outputs to the signal output circuit 70 and the scanning circuit 80 clock signals that synchronize operations of the signal output circuit 70 and the scanning circuit 80. The scanning circuit 80 scans the sub-pixel 15 in synchronism with the video signal from the signal output circuit 70. As illustrated in FIG. 8, for example, the embodiment may employ a configuration in which the signal output circuit 70 and the signal processing circuit 100 are included in a single IC chip 160, or a configuration in which the signal output circuit 70 and the signal processing circuit 100 are individual circuit chips. FIG. 26 illustrates circuit chips including the IC chip 160, in a peripheral region SA of a first substrate 41 using a Chip-On-Glass (COG) technique. This is merely one example of implementation of the circuit chips, and the present disclosure is not limited thereto. The circuit chips may be mounted on, for example, a flexible printed circuit (FPC) coupled with the first substrate 41, using a Chip-On-Film (COF) 150.

Figure 27:
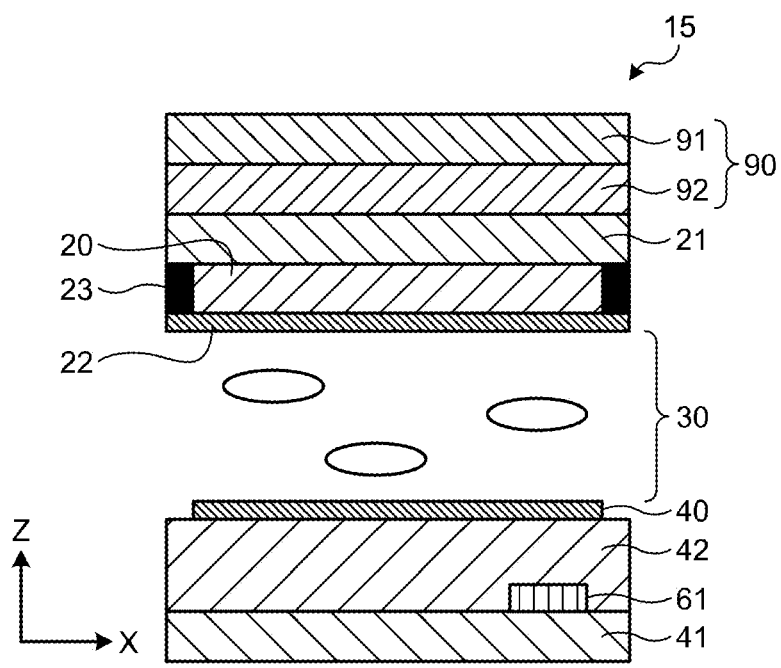
FIG. 27 is a cross-sectional view schematically illustrating a sub-pixel.

FIG. 27 is a cross-sectional view schematically illustrating the sub-pixel 15. The reflective electrode 40 faces the counter electrode 22 with the liquid crystal layer 30 interposed therebetween. The reflective electrode 40 is disposed on the display region OA of the first substrate 41. Specifically, wiring including the signal line 61, and an insulation layer 42 are stacked on a surface of the first substrate 41, the surface facing the liquid crystal layer 30. The insulation layer 42 insulates one wiring from another wiring and from electrodes. The reflective electrode 40 is provided to each sub-pixel 15. The reflective electrode 40 is a metal electrode that is formed of thin film silver (Ag), for example, and that reflects light. The counter electrode 22 and the color filter 20 are disposed on the display region OA of a second substrate 21. Specifically, the color filter 20 is disposed on a surface of the second substrate 21, the surface facing the liquid crystal layer 30. The black matrix 23 is disposed among the color filters 20. The counter electrode 22 is a film-shaped electrode formed on a surface of the color filter 20. The counter electrode 22 transmits light and is formed of, for example, indium tin oxide (ITO). The first substrate 41 and the second substrate 21 are formed of a light transmissive material such as glass and a transparent resin. The display region OA is capable of receiving the external light IL incident thereon and emitting the light OL. The peripheral region SA, on which a light blocking member identical to the black matrix 23 is disposed, is incapable of receiving the external light IL incident thereon and emitting the light OL. A configuration not including the black matrix may also be employed to improve luminance.

The sub-pixel 15 illustrated in FIG. 27 is, for example, one of the first sub-pixel 11, the second sub-pixel 12, the third sub-pixel 13, and the fourth sub-pixel 14. Specifically, the sub-pixels 15 each include the individual reflective electrode 40. The reflective electrode 40 faces the counter electrode 22 with the liquid crystal layer 30 interposed therebetween.

The first substrate 41 and the second substrate 21 are, for example, glass substrates that transmit light. The counter electrode 22 transmits light and is formed of, for example, indium tin oxide (ITO). The reflective electrode 40 is a metal electrode that is formed of thin film silver (Ag), for example, and that reflects light.

The liquid crystal layer 30 is sealed with a sealing material, which is not illustrated. The sealing material seals the liquid crystal layer 30 by bonding the first substrate 41 and the second substrate 21 at their ends. A spacer, which is not illustrated, determines a distance between the reflective electrode 40 and the counter electrode 22. An initial orientation state of liquid crystal molecules of the liquid crystal layer 30 is determined by orientation films (not illustrated) provided to the respective first and second substrates 41 and 21. The liquid crystal molecules do not transmit light in the initial orientation state. The state of not transmitting light in the initial orientation state in which no electric field is applied to the liquid crystal layer 30 is referred to as a normally black state.

The spectrum of the light OL transmitted through the color filter 20 illustrated in FIG. 27 has a peak that falls on any one of the spectrum of reddish green, the spectrum of bluish green, the spectrum of red, and the spectrum of blue, as described with reference to FIG. 3.

As described above, the display device 1 includes: the first substrate 41 provided with the reflective electrode 40; the second substrate 21 provided with the color filter 20 and the translucent electrode (counter electrode 22); and the liquid crystal layer 30 disposed between the reflective electrode 40 and the translucent electrode. As described with reference to FIG. 1, the light modulation layer 90, for example, to modulate the scattering direction of the light OL emitted from the display device 1, may be provided to the second substrate 21 on the opposite side of the liquid crystal layer 30 with the color filter 20 interposed therebetween. The light modulation layer 90 includes, for example, a polarizing plate 91 and a scattering layer 92. The polarizing plate 91 faces a display surface. The scattering layer 92 is disposed between the polarizing plate 91 and the second substrate 21. The polarizing plate 91 prevents glare by transmitting beams of light polarized in a specific direction. The scattering layer 92 scatters the light OL reflected by the reflective electrode 40. Transmissivity with which the light OL transmits through the liquid crystal layer 30 depends on the output gradation values (R1, RG, BG, and B1).

Figure 28:
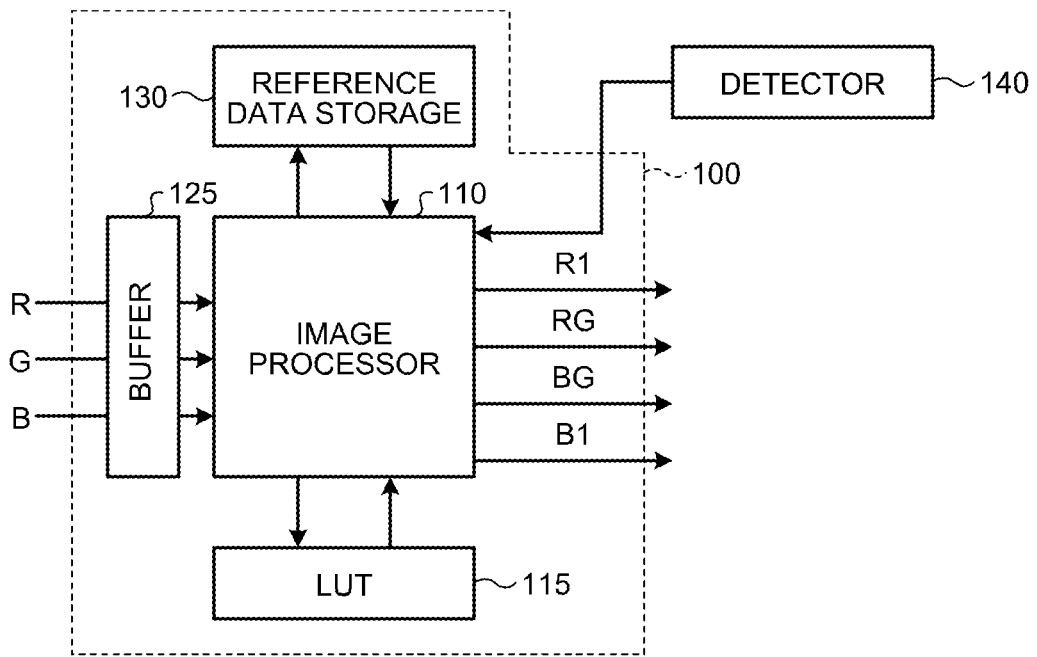
FIG. 28 is a block diagram illustrating an exemplary configuration of a signal processing circuit.

FIG. 28 is a block diagram illustrating an exemplary configuration of the signal processing circuit. The signal processing circuit 100 includes the image processor 110, a look-up table (LUT) 115, a buffer 125, and a reference data storage 130. The signal processing circuit 100 receives an input of data indicating brightness of the external light detected by a detector 140 included in the display device 1. The detector 140 is, for example, an illumination sensor that can detect the brightness of the external light that illuminates the display device 1.

The image processor 110 generates an image signal for displaying an image on the display region OA. Specifically, the image processor 110 identifies the output gradation values (R1, RG, BG, and B1) of the respective four sub-pixels 15 included in each pixel (e.g., pixel 10) according to the input gradation values. The gradation value of "RG" out of the output gradation values (R1, RG, BG, and B1) of the four respective sub-pixels 15 is the gradation value of the red green RG1, for example. Specifically, "RG" corresponds to the peak of the spectrum of the light transmitted through the first color filter included in the first sub-pixel. The gradation value of "BG" is the gradation value of the blue green BG1, for example. Specifically, "BG" corresponds to the peak of the spectrum of the light transmitted through the second color filter included in the second sub-pixel. The gradation value of "R1" is the gradation value of the red (R1), for example. Specifically, "R1" corresponds to the peak of the spectrum of the light transmitted through the third color filter included in the third sub-pixel. The gradation value of "B1" is the gradation value of the blue (B1), for example. Specifically, "B1" corresponds to the peak of the spectrum of the light transmitted through the fourth color filter included in the fourth sub-pixel.

The input gradation values applied to the signal processing circuit 100 are stored and retained in the buffer 125. The buffer 125 stores the input gradation values associated with all or part of the pixel region constituting the input image.

In accordance with the input gradation values in the pixel region retained in the buffer 125, the image processor 110 determines: whether the input image includes the gradation values of the first color and the gradation values of the second color providing higher brightness than that of the first color; and whether the first pixel region composed of at least one pixel to which the gradation values of the first color are allocated is adjacent to the second pixel region composed of at least one pixel to which the gradation values of the second color are allocated. Specifically, the image processor 110 reads the input gradation values of each of the pixels that constitute all or part of the pixel region constituting the input image retained in the buffer 125. In accordance with the color and saturation indicated by the input gradation values, the image processor 110 determines: whether the first pixel region to which the gradation values of the first color are allocated and the second pixel region to which the gradation values of the second color are allocated exist; and whether the first pixel region is adjacent to the second pixel region. The image processor 110 may determine, in accordance with a threshold of a predetermined number of pixels and a size of continuous pixel regions having identical input gradation values, whether the condition on the number of pixels treated as the first pixel region and the second pixel region is satisfied.

The LUT 115 is a data table including information on the gradation values of the four respective sub-pixels 15 predetermined for the gradation values of R, G, and B. The following describes an example in which the LUT 115 determines the gradation value of each of the first sub-pixel 11, the second sub-pixel 12, the third sub-pixel 13, and the fourth sub-pixel 14 illustrated in FIG. 3. The image processor 110 refers to the LUT 115 and identifies the gradation values of (R1, RG1, BG1, and B1) corresponding to the input gradation values. For example, when the input gradation values are expressed as (R, G, B)=(n, n, n) as illustrated in FIG. 4, the image processor 110 refers to the LUT 115 and identifies the gradation values as (R1, RG1, BG1, B1)=(n1, n2, n3, n4), where (n1, n2, n3, n4) represent gradation values for reproducing colors corresponding to (R, G, B)=(n, n, n) using colors of the first sub-pixel 11, the second sub-pixel 12, the third sub-pixel 13, and the fourth sub-pixel 14. The same applies to a case in which the input gradation values are other gradation values. When the input gradation values are expressed as (R, G, B)=(n, 0, 0), the image processor 110 identifies the gradation values as (R1, RG1, BG1, B1)=(n, 0, 0, 0). When the input gradation values are expressed as (R, G, B)=(0, n, 0), the image processor 110 identifies the gradation values as (R1, RG1, BG1, B1)=(0, n5, n6, 0). When the input gradation values are expressed as (R, G, B)=(0, 0, n), the image processor 110 identifies the gradation values as (R1, RG1, BG1, B1)=(0, 0, 0, n). When the input gradation values are expressed as (R, G, B)=(m, m, 0), the image processor 110 identifies the gradation values as (R1, RG1, BG1, B1)=(m1, m2, m3, 0). When the input gradation values are expressed as (R, G, B)=(0, m, m), the image processor 110 identifies the gradation values as (R1, RG1, BG1, B1)=(0, m4, m5, m6). When the input gradation values are expressed as (R, G, B)=(m, 0, m), the image processor 110 identifies the gradation values as (R1, RG1, BG1, B1)=(m 7, 0, 0, m8).

The image processor 110 applies gain to the gradation values of the pixel 10 obtained from the combination of the gradation values of the first sub-pixel 11, the second sub-pixel 12, the third sub-pixel 13, and the fourth sub-pixel 14. When the first pixel region is adjacent to the second pixel region, the image processor 110 applies gain so that the brightness of the second color is lower than the brightness of the first color, compared with gain applied to the gradation values of the first color. Specifically, the image processor 110 applies gain (e.g., the expansion factor ($\alpha$) or the reverse gain factor ($\beta$)) to the input gradation values, as described previously with reference to, for example, FIGS. 7 to 24.

The detector 140 detects brightness of the external light. The detector 140 outputs to the image processor 110 data indicating the detected brightness of the external light. When using a parameter indicating the brightness of the external light in applying gain, the image processor 110 uses the brightness of the external light indicated by the data input from the detector 140.

The reference data storage 130 stores reference data (refer to FIGS. 17 and 18, for example). When replacing the yellow Y1 to be reproduced by the pixel 10 in the first pixel region with the yellow Y2, the image processor 110 reads the reference data stored in the reference data storage 130 and determines the combination of sub-pixels 15 used for reproducing the first color, as described previously with reference to FIGS. 17 and 18. The image processor 110 outputs to the signal output circuit 70 the output gradation values (R1, RG, BG, and B1) of the respective four sub-pixels 15.

Figure 29:
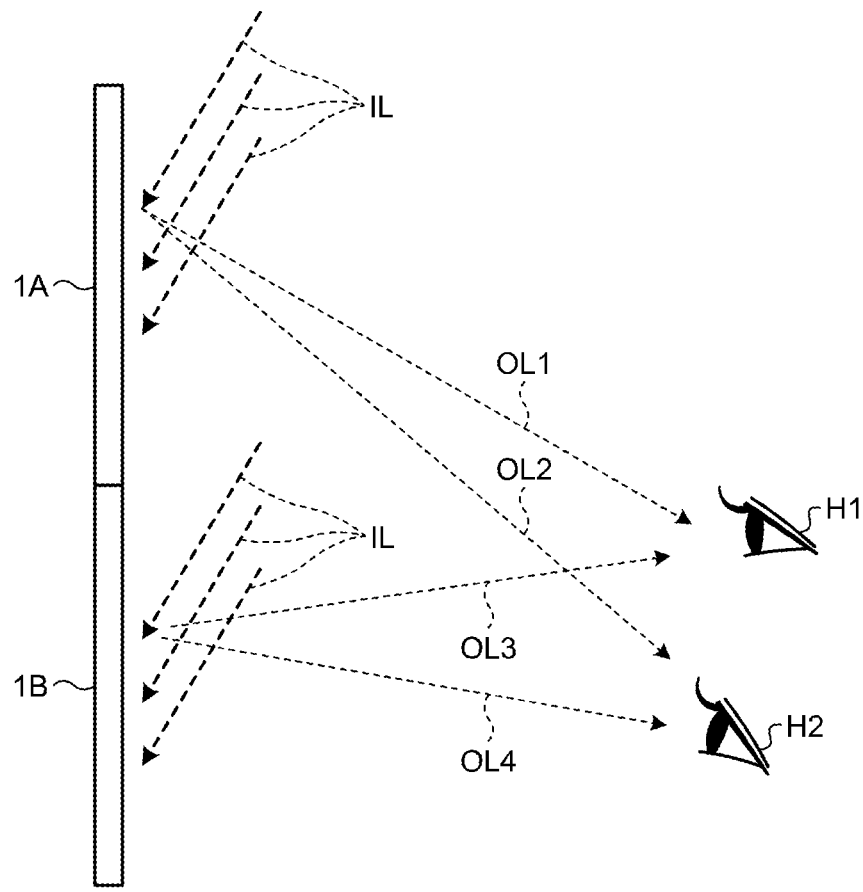
FIG. 29 is a diagram schematically illustrating an exemplary relation among external light, reflected light, and user's viewpoints when a plurality of display devices are disposed in juxtaposition.

FIG. 29 is a diagram schematically illustrating an exemplary relation among the external light IL, reflected light OL1, OL2, OL3, and OL4, and user's viewpoints H1 and H2 when a plurality of display devices 1A and 1B are disposed in juxtaposition. Each of the display devices 1A and 1B is the display device in the embodiment (e.g., display device 1). The reflected light OL1, OL2, OL3, and OL4 represent beams of light OL having exit angles different from each other. As illustrated in FIG. 29, when the display devices 1A and 1B are disposed in juxtaposition, for example, beams of light OL having different exit angles from the display devices 1A and 1B may be viewed as with the reflected light OL1 from the display device 1A and the reflected light OL3 from the display device 1B with respect to the user's viewpoint H1 even with an incident angle of incident light IL on the display device 1A being identical to an incident angle of incident light IL on the display device 1B. Which of the reflected light OL1 or the reflected light OL2 from the display device 1A is viewed by the user is changed depending on which of the user's viewpoint H1 or the user's view point H2 is assumed. Similarly, which of the reflected light OL3 or the reflected light OL4 from the display device 1B is viewed by the user is changed depending on which of the user's viewpoint H1 or the user's view point H2 is assumed.

Consequently, the exit angle of the light OL viewed by the user may vary depending on conditions, such as how the display devices 1A and 1B are disposed, and where the user's viewpoint is. Thus, the display device 1A may be configured differently from the display device 1B without departing from the scope of the present disclosure. For example, either one of the display devices 1A and 1B may be configured as having the area ratio of the four sub-pixels 15 as illustrated in FIG. 3, and the other of the display devices 1A and 1B may be configured having the area ratio of the four sub-pixels 15 different from the area ratio of FIG. 3. Alternatively, the correspondence relation between the input (gradation values of R, G, and B) and (R1, RG, BG, and B1) in the LUT 115 of the display device 1A may be made different from the correspondence relation between the input gradation values (gradation values of R, G, and B) and the output gradation values (R1, RG, BG, and B1) in the LUT 115 of the display device 1B.

As described above, according to the present embodiment, the application of gain can enhance luminance. When the first pixel region composed of at least one pixel to which the gradation values of the first color are allocated is adjacent to the second pixel region composed of at least one pixel to which the gradation values of the second color, which is brighter than the first color, are allocated, gain applied to the gradation values of the second color is reduced relative to gain applied to the gradation values of the first color. The foregoing approach can prevent optical illusion as if saturation of the first pixel regions were lowered.

When brightness of the second pixel region is equal to or higher than brightness of the first pixel region in the input image, gain applied to the gradation values of the first color and the gradation values of the second color is determined so that the brightness of the second pixel region is lower than the brightness of the first pixel region. This approach can prevent dinginess more reliably.

Gain applied to the gradation values of the first color and the gradation values of the second color is determined on the basis of the brightness of the external light. With this approach, the way of applying gain can be determined on the basis of the determination as to whether dinginess is caused by the brightness of the external light.

When the brightness of the external light is equal to or higher than a predetermined level, gain applied to the gradation values of the second color is reduced relative to gain applied to the gradation values of the first color. This approach can prevent dinginess more reliably.

The first color is yellow and the second color is white. Thus, saturation of the yellow that requires vividness can be made more easily viewed.

The first sub-pixel includes the third color filter that has a spectrum peak falling on the spectrum of reddish green. The second sub-pixel includes the fourth color filter that has a spectrum peak falling on the spectrum of bluish green. The third sub-pixel includes the first color filter that has a spectrum peak falling on the spectrum of red. The fourth sub-pixel includes the second color filter that has a spectrum peak falling on the spectrum of blue. The foregoing configuration can further increase the luminance and saturation of yellow, thereby achieving the required luminance and saturation of yellow (e.g., yellow Y).

The first sub-pixel and the second sub-pixel in combination reproduce green. This configuration can allocate a greater area of color filters and reflective electrodes combining the first sub-pixel and the second sub-pixel out of the display region of a single pixel to the reproduction of green.

The present disclosure can naturally provide other advantageous effects that are provided by the aspects described in the embodiment above and are clearly defined by the description in the present specification or appropriately conceivable by those skilled in the art.

What is claimed is:

1. A display device comprising:
a display unit including a plurality of pixels, the pixels including
a first sub-pixel including a first color filter configured to transmit light having a spectrum peak falling on a spectrum of reddish green,
a second sub-pixel including a second color filter configured to transmit light having a spectrum peak falling on a spectrum of bluish green,
a third sub-pixel including a third color filter configured to transmit light having a spectrum peak falling on a spectrum of red, and
a fourth sub-pixel including a fourth color filter configured to transmit light having a spectrum peak falling on a spectrum of blue; and
an image processor configured to generate an image signal for displaying an image on the display unit, wherein,
when the image processor causes the display unit to display the image such that a first pixel region that displays a first-region color is adjacent to a second pixel region that displays a second-region color and that has luminance higher than luminance of the first-region color, the image processor applies gain to an image signal corresponding to a pixel in the second pixel region to make brightness of the second pixel region lower than brightness of the first pixel region, and
when the first-region color is yellow reproduced through a combination of the first sub-pixel and the third sub-pixel, the image processor adds the second sub-pixel to the combination in reproducing the first-region color in the first pixel region.

2. The display device according to claim 1, wherein the first sub-pixel and the second sub-pixel in combination reproduce green.

3. The display device according to claim 1, further comprising:
a detector configured to detect brightness of external light, wherein
the image processor determines a gain factor to be applied to the image signal corresponding to the pixel in the second pixel region based on the brightness of the external light.

4. The display device according to claim 1, wherein the second-region color is white.

5. The display device according to claim 1, wherein the first sub-pixel, the second sub-pixel, the third sub-pixel, and the fourth sub-pixel of the pixel each include a reflective electrode configured to reflect light transmitted through the corresponding color filter.

6. The display device according to claim 1, wherein, when the first pixel region is surrounded by the second pixel region, the image processor applies gain to the image signal corresponding to the pixel in the second pixel region.

7. The display device according to claim 1, wherein, when the first pixel region adjacent to the second pixel region is equal in size to or smaller in size than the second pixel region, the image processor applies gain to the image signal corresponding to the pixel in the second pixel region.

8. A display device comprising:
a display unit including a plurality of pixels;
an image processor configured to generate an image signal for displaying an image on the display unit and
a detector configured to detect brightness of external light, wherein,
when the image processor causes the display unit to display the image such that a first pixel region that displays a first-region color is adjacent to a second pixel region that displays a second-region color and that has luminance higher than luminance of the first-region color, the image processor applies gain to an image signal corresponding to a pixel in the second pixel region to make brightness of the second pixel region lower than brightness of the first pixel region,
the image processor determines a gain factor to be applied to the image signal corresponding to the pixel in the second pixel region based on the brightness of the external light, and
when the brightness of the external light is equal to or higher than a predetermined level, the image processor applies gain to the image signal corresponding to the pixel belonging to the second pixel region such that the brightness of the second pixel region is lower than the brightness of the first pixel region.

9. The display device according to claim 8, wherein the first-region color is yellow and the second-region color is white.

10. The display device according to claim 8, wherein, when the first pixel region is surrounded by the second pixel region, the image processor applies gain to the image signal corresponding to the pixel in the second pixel region.

11. The display device according to claim 8, wherein, when the first pixel region adjacent to the second pixel region is equal in size to or smaller in size than the second pixel region, the image processor applies gain to the image signal corresponding to the pixel in the second pixel region.

* * * * *